US010649421B2

(12) United States Patent
Nelmes et al.

(10) Patent No.: US 10,649,421 B2
(45) Date of Patent: May 12, 2020

(54) DEVICES AND METHODS FOR PROTECTING UNATTENDED CHILDREN IN THE HOME

(71) Applicant: GOOGLE LLC, Mountain View, CA (US)

(72) Inventors: Sierra Leigh Nelmes, Rocklin, CA (US); Sophie Solvieg Le Guen, Burlingame, CA (US); Maxime Veron, Los Altos, CA (US); Isabel Guenette, Palo Alto, CA (US); David Sloo, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/832,703

(22) Filed: Dec. 5, 2017

(65) Prior Publication Data

US 2018/0095482 A1 Apr. 5, 2018

Related U.S. Application Data

(63) Continuation of application No. 14/675,642, filed on Mar. 31, 2015, now Pat. No. 9,836,069.

(51) Int. Cl.
*G05B 19/048* (2006.01)
*G05B 15/02* (2006.01)

(52) U.S. Cl.
CPC ...... *G05B 15/02* (2013.01); *G05B 2219/2642* (2013.01)

(58) Field of Classification Search
CPC .. G08B 25/008; G08B 29/185; G08B 25/001; G08B 19/005; G08B 21/22; G08B 23/00;
(Continued)

(56) References Cited

U.S. PATENT DOCUMENTS 4,305,130 A * 12/1981 Kelley ............... B25J 19/023
318/640
4,412,293 A * 10/1983 Kelley ............... B25J 15/0266
414/730
(Continued)

FOREIGN PATENT DOCUMENTS

WO WO 2011037564 A1 3/2011

OTHER PUBLICATIONS

How to protect your child from electrical hazards, sheknows, 12OCT2008, 9 pgs, http://www.sheknows.com/home-and-gardening/articles/7068/how-to-protect-your-child-from-electrical-hazards.
(Continued)

*Primary Examiner* — Darrin D Dunn
(74) *Attorney, Agent, or Firm* — Morgan, Lewis & Bockius LLP

(57) ABSTRACT

The various implementations described herein include methods and systems for protecting unattended children in the home. In one aspect, a method is performed at computer system. The computer system: (1) receives occupancy data for a room in a smart home environment; (2) determines based on the received occupancy data whether a predetermined child-protection alert condition is met; (3) in accordance with a determination that the condition is met, presents or sends instructions to issue a child-protection alert; (4) receives a request to cancel the child-protection alert; (5) in accordance with a determination that the request is a first type of cancellation request, cancels the child-protection alert and modifies the predetermined child-protection alert condition; and (6) in accordance with a determination that the request is a second type of cancellation request, cancels the child-protection alert and foregoes modifying the predetermined child-protection alert condition.

19 Claims, 12 Drawing Sheets

(58) Field of Classification Search
CPC ...... G08B 25/00; G08B 25/002; G08B 25/14; G08B 31/00; G08B 13/00; G08B 13/19652
See application file for complete search history.

(56) References Cited

U.S. PATENT DOCUMENTS

| | | | | |
|---|---|---|---|---|
| 4,781,517 | A * | 11/1988 | Pearce | B23P 19/04 104/167 |
| 4,813,125 | A * | 3/1989 | Dacey, Jr. | B62D 65/00 29/33 K |
| 4,815,190 | A * | 3/1989 | Haba, Jr. | B23P 21/004 198/346.1 |
| 4,831,549 | A * | 5/1989 | Red | B25J 9/1692 700/254 |
| 4,894,908 | A * | 1/1990 | Haba, Jr. | B23P 21/004 29/711 |
| 5,040,056 | A * | 8/1991 | Sager | B25J 9/0093 348/88 |
| 5,041,907 | A * | 8/1991 | Sager | B07C 5/3422 348/91 |
| 5,091,780 | A * | 2/1992 | Pomerleau | G06K 9/00771 348/152 |
| 5,120,190 | A * | 6/1992 | Smith | B65G 47/1492 198/391 |
| 5,125,149 | A * | 6/1992 | Inaba | B23P 19/001 198/341.05 |
| 5,184,766 | A * | 2/1993 | Takahashi | B23K 37/047 228/4.1 |
| 5,353,495 | A * | 10/1994 | Terabayashi | B23P 21/00 198/346.2 |
| 5,380,978 | A * | 1/1995 | Pryor | B23K 26/032 219/121.64 |
| 5,506,682 | A * | 4/1996 | Pryor | A01B 69/008 356/400 |
| 5,521,652 | A | 5/1996 | Shalvi | |
| 5,793,290 | A * | 8/1998 | Eagleson | G08B 13/2454 340/539.1 |
| 5,910,894 | A * | 6/1999 | Pryor | G05B 19/41875 219/121.64 |
| 5,930,144 | A * | 7/1999 | Kondo | B23P 19/001 414/273 |
| 6,011,328 | A | 1/2000 | Smith | |
| 6,167,607 | B1 * | 1/2001 | Pryor | A01B 69/008 29/407.04 |
| 6,314,631 | B1 * | 11/2001 | Pryor | A01B 69/008 29/407.04 |
| 6,415,204 | B1 * | 7/2002 | Hirabayashi | B23P 21/004 700/245 |
| 6,611,206 | B2 | 8/2003 | Eshelman et al. | |
| 6,720,880 | B2 | 4/2004 | Gutta et al. | |
| 6,825,761 | B2 * | 11/2004 | Christ | G08B 13/189 340/506 |
| 6,859,677 | B2 * | 2/2005 | Mitterholzer | G05B 19/41875 700/110 |
| 7,109,861 | B2 * | 9/2006 | Rao | G08B 21/0202 340/541 |
| 7,138,921 | B1 * | 11/2006 | Fontaine | G08B 13/196 340/573.4 |
| 7,143,494 | B2 * | 12/2006 | Savoy | B62D 65/06 29/407.1 |
| 7,164,354 | B1 * | 1/2007 | Panzer | G07C 9/00111 235/384 |
| 7,254,403 | B2 * | 8/2007 | La | H04L 12/2803 340/3.1 |
| 7,313,464 | B1 * | 12/2007 | Perreault | B25J 9/1666 318/568.1 |
| 7,554,444 | B2 | 6/2009 | Rao | |
| 7,634,382 | B2 | 12/2009 | Andenna et al. | |
| 7,657,763 | B2 | 2/2010 | Nelson et al. | |
| 7,817,029 | B1 * | 10/2010 | Hillenburg | G08B 25/001 340/501 |
| 7,825,546 | B2 | 11/2010 | Li et al. | |
| 7,843,081 | B2 | 11/2010 | Lim | |
| 7,906,869 | B2 | 3/2011 | Lee et al. | |
| 7,911,746 | B2 | 3/2011 | Zaretsky et al. | |
| 8,004,123 | B2 | 8/2011 | Hodges et al. | |
| 8,138,626 | B2 | 3/2012 | Jonsson et al. | |
| 8,244,405 | B2 | 8/2012 | Kao et al. | |
| 8,659,657 | B2 * | 2/2014 | Brumfield | G08B 13/19613 340/539.15 |
| 8,818,532 | B1 | 8/2014 | Vasquez | |
| 8,904,042 | B1 * | 12/2014 | Dellecave, Jr. | G06F 16/951 709/246 |
| 8,930,146 | B2 | 1/2015 | Katsukura et al. | |
| 9,008,841 | B2 * | 4/2015 | Fuhlbrigge | B25J 9/1687 700/253 |
| 9,084,937 | B2 * | 7/2015 | Gadher | G06F 11/008 |
| 9,110,450 | B2 | 8/2015 | Alberth, Jr. et al. | |
| 9,189,709 | B2 * | 11/2015 | Saruta | G06K 9/78 |
| 9,227,484 | B1 | 1/2016 | Justice et al. | |
| 9,279,661 | B2 * | 3/2016 | Tateno | G01B 11/002 |
| 9,459,772 | B2 | 10/2016 | Nihal | |
| 9,460,596 | B1 | 10/2016 | Moses | |
| 9,508,091 | B2 | 11/2016 | Quady | |
| 9,513,625 | B2 * | 12/2016 | Kilibarda | B23P 21/004 |
| 10,135,856 | B2 * | 11/2018 | Tripp | H04L 63/1433 |
| 10,157,529 | B2 * | 12/2018 | Rubinstein | G08B 21/0283 |
| 10,163,314 | B2 * | 12/2018 | Tofighbakhsh | H04W 4/70 |
| 2002/0022991 | A1 | 2/2002 | Sharood et al. | |
| 2002/0158763 | A1 | 10/2002 | Takarada et al. | |
| 2003/0081825 | A1 * | 5/2003 | Mitterholzer | G05B 19/41875 382/141 |
| 2003/0093200 | A1 * | 5/2003 | Gutta | G08B 13/19602 701/45 |
| 2003/0208302 | A1 * | 11/2003 | Lemelson | G05B 19/19 700/245 |
| 2004/0071321 | A1 * | 4/2004 | Watkins | G07C 9/00 382/115 |
| 2004/0088553 | A1 | 5/2004 | Levin et al. | |
| 2004/0176041 | A1 * | 9/2004 | Smith | H04B 7/18532 455/67.11 |
| 2005/0068172 | A1 * | 3/2005 | King | G08B 21/0247 340/539.23 |
| 2005/0240959 | A1 * | 10/2005 | Kuhn | H04N 7/163 725/25 |
| 2006/0111816 | A1 | 5/2006 | Spalink et al. | |
| 2006/0167587 | A1 * | 7/2006 | Read | B23Q 9/00 700/245 |
| 2006/0238035 | A1 | 10/2006 | Wainewright | |
| 2006/0267780 | A1 * | 11/2006 | Adams | A61B 5/1113 340/573.1 |
| 2007/0039155 | A1 * | 2/2007 | Savoy | B62D 65/06 29/407.1 |
| 2007/0096927 | A1 * | 5/2007 | Albert | G08B 1/08 340/573.1 |
| 2007/0149013 | A1 | 6/2007 | Eastham et al. | |
| 2007/0276776 | A1 * | 11/2007 | Sagher | G06K 9/00771 706/25 |
| 2008/0048826 | A1 | 2/2008 | Agrawal et al. | |
| 2008/0048870 | A1 * | 2/2008 | Laitta | G08B 13/19652 340/573.6 |
| 2008/0181485 | A1 * | 7/2008 | Beis | B25J 9/1697 382/153 |
| 2008/0201277 | A1 * | 8/2008 | Ozdemir | G08B 13/19641 706/11 |
| 2008/0214935 | A1 | 9/2008 | Levin | |
| 2008/0268897 | A1 * | 10/2008 | Seier | H04M 1/72516 455/550.1 |
| 2008/0309164 | A1 | 12/2008 | Lim | |
| 2009/0098754 | A1 | 4/2009 | Li et al. | |
| 2009/0118858 | A1 * | 5/2009 | Wallace | B23P 19/001 700/110 |
| 2009/0133249 | A1 * | 5/2009 | Case | H05K 13/0812 29/740 |
| 2009/0192927 | A1 | 7/2009 | Berg et al. | |
| 2009/0222142 | A1 | 9/2009 | Kao et al. | |
| 2010/0045461 | A1 * | 2/2010 | Caler | G08B 25/008 340/541 |

(56) References Cited

U.S. PATENT DOCUMENTS

| | | | |
|---|---|---|---|
| 2010/0138378 A1* | 6/2010 | Jannarone | G06N 20/00 706/52 |
| 2010/0180711 A1* | 7/2010 | Kilibarda | B05C 5/0216 74/490.06 |
| 2010/0225469 A1* | 9/2010 | Yoshioka | G08B 21/0233 340/539.13 |
| 2011/0015795 A1 | 1/2011 | Boyer et al. | |
| 2011/0031950 A1 | 2/2011 | Hodges et al. | |
| 2011/0131008 A1* | 6/2011 | Swanson | G01B 5/004 702/152 |
| 2011/0202495 A1* | 8/2011 | Gawlick | A61B 5/0002 706/59 |
| 2011/0228080 A1* | 9/2011 | Ding | H01L 21/67259 348/135 |
| 2011/0282497 A1 | 11/2011 | Josephson et al. | |
| 2011/0307743 A1* | 12/2011 | Khalak | G05B 23/0262 714/47.2 |
| 2011/0314665 A1* | 12/2011 | Kilibarda | B23P 19/001 29/783 |
| 2012/0086568 A1 | 4/2012 | Scott et al. | |
| 2012/0158180 A1* | 6/2012 | Iio | B25J 9/1679 700/259 |
| 2012/0165986 A1* | 6/2012 | Fuhlbrigge | B25J 9/1687 700/259 |
| 2012/0259462 A1* | 10/2012 | Aoba | B25J 9/1697 700/245 |
| 2012/0271782 A1* | 10/2012 | Blowers | G05B 23/00 706/12 |
| 2012/0283873 A1* | 11/2012 | Le | B25J 9/1674 700/250 |
| 2012/0330109 A1 | 12/2012 | Tran | |
| 2013/0001422 A1 | 1/2013 | Lavon et al. | |
| 2013/0011018 A1* | 1/2013 | Tateno | G01B 11/002 382/106 |
| 2013/0031384 A1 | 1/2013 | Yamamoto | |
| 2013/0033363 A1* | 2/2013 | Gabara | G01S 5/30 340/8.1 |
| 2013/0037165 A1 | 2/2013 | Okawachi et al. | |
| 2013/0049955 A1 | 2/2013 | Hoover et al. | |
| 2013/0072807 A1 | 3/2013 | Tran | |
| 2013/0090213 A1 | 4/2013 | Amini et al. | |
| 2013/0093573 A1 | 4/2013 | Kwong | |
| 2013/0109342 A1 | 5/2013 | Welch | |
| 2013/0147944 A1* | 6/2013 | Zhang | B25J 9/1661 348/95 |
| 2013/0154808 A1 | 6/2013 | Han et al. | |
| 2013/0158696 A1* | 6/2013 | Wallace | B23P 19/001 700/112 |
| 2013/0190095 A1* | 7/2013 | Gadher | G06F 11/008 463/42 |
| 2013/0329035 A1* | 12/2013 | Yamamoto | H04N 7/18 348/86 |
| 2014/0012415 A1* | 1/2014 | Benaim | G06K 9/00355 700/248 |
| 2014/0032003 A1 | 1/2014 | Chapel | |
| 2014/0054973 A1 | 2/2014 | Asanuma et al. | |
| 2014/0067137 A1 | 3/2014 | Amelio et al. | |
| 2014/0140590 A1 | 5/2014 | Wilson et al. | |
| 2014/0208563 A1* | 7/2014 | Black | B60Q 1/045 29/423 |
| 2014/0266600 A1 | 9/2014 | Alberth, Jr. et al. | |
| 2014/0266669 A1* | 9/2014 | Fadell | G05B 19/042 340/501 |
| 2014/0297278 A1* | 10/2014 | Flanagan | G06Q 10/10 704/235 |
| 2014/0320312 A1* | 10/2014 | Sager | H04Q 9/00 340/870.16 |
| 2014/0320649 A1 | 10/2014 | Starr et al. | |
| 2014/0375451 A1* | 12/2014 | Douglas | H04W 4/80 340/539.12 |
| 2015/0009029 A1* | 1/2015 | Martin | A61B 5/7405 340/539.15 |
| 2015/0029020 A1* | 1/2015 | Bailey | G08B 25/001 340/502 |
| 2015/0061859 A1* | 3/2015 | Matsuoka | G08B 27/00 340/501 |
| 2015/0066200 A1* | 3/2015 | McCarthy | B07C 5/3422 700/223 |
| 2015/0120596 A1* | 4/2015 | Fadell | G08B 27/003 705/330 |
| 2015/0127712 A1* | 5/2015 | Fadell | G06Q 10/083 709/202 |
| 2015/0137969 A1* | 5/2015 | Blum | G08B 25/001 340/506 |
| 2015/0254716 A1 | 9/2015 | Quady | |
| 2015/0301527 A1* | 10/2015 | Erickson | B63H 21/21 701/2 |
| 2015/0302725 A1* | 10/2015 | Sager | H04Q 9/00 340/870.16 |
| 2015/0325107 A1* | 11/2015 | Poder | G08B 25/001 340/506 |
| 2015/0348400 A1* | 12/2015 | Zribi | G08B 29/185 340/506 |
| 2015/0364022 A1* | 12/2015 | Dyell | A61B 5/746 340/573.1 |
| 2016/0018800 A1 | 1/2016 | Gettings et al. | |
| 2016/0019780 A1 | 1/2016 | Gettings et al. | |
| 2016/0027278 A1 | 1/2016 | McIntosh et al. | |
| 2016/0031339 A1 | 2/2016 | Geo | |
| 2016/0044451 A1* | 2/2016 | Marth | H04W 4/02 340/8.1 |
| 2016/0078387 A1 | 3/2016 | Bak et al. | |
| 2016/0091872 A1 | 3/2016 | Marti et al. | |
| 2016/0117903 A1* | 4/2016 | Striemer | G08B 21/0205 340/457 |
| 2016/0182558 A1* | 6/2016 | Tripp | H04L 63/1433 726/25 |
| 2016/0232779 A1 | 8/2016 | Sloo et al. | |
| 2016/0240060 A1 | 8/2016 | Wang | |
| 2016/0259308 A1* | 9/2016 | Fadell | G05B 15/02 |
| 2016/0261932 A1* | 9/2016 | Fadell | H04Q 9/00 |
| 2016/0287073 A1 | 10/2016 | Pradeep et al. | |
| 2016/0287166 A1 | 10/2016 | Tran | |
| 2016/0293026 A1 | 10/2016 | Pradeep et al. | |
| 2016/0293042 A1 | 10/2016 | Pradeep et al. | |
| 2016/0329751 A1 | 11/2016 | Mach et al. | |
| 2016/0336816 A1 | 11/2016 | Mach et al. | |
| 2016/0379458 A1* | 12/2016 | Eyring | G08B 13/2491 340/5.81 |
| 2017/0076562 A1* | 3/2017 | Hicks, III | G08B 7/06 |
| 2017/0084160 A1* | 3/2017 | Piccolo, III | G08B 25/001 |
| 2017/0186309 A1* | 6/2017 | Sager | H04Q 9/00 |
| 2018/0040223 A1* | 2/2018 | Bodi | G08B 21/0415 |
| 2018/0047212 A1* | 2/2018 | Long | G08B 13/19684 |
| 2018/0047230 A1* | 2/2018 | Nye | G05B 15/02 |
| 2018/0130327 A1* | 5/2018 | Rogers | G08B 21/028 |
| 2018/0158315 A1* | 6/2018 | Sloo | F24F 11/30 |
| 2018/0165946 A1* | 6/2018 | Poder | G08B 25/001 |
| 2018/0315301 A1* | 11/2018 | Subramanian | G06K 9/6278 |
| 2018/0322758 A1* | 11/2018 | Rubinstein | G08B 21/0283 |
| 2018/0330602 A1* | 11/2018 | Kleihorst | G08B 25/014 |

OTHER PUBLICATIONS

Locker, Industrial GFCIs are finally here, Control Engineering, Jun. 11, 2013, 4 pgs, http://www.controleng.com/single-article/industrial-gfcis-are-finally-here/846313cb95aeddfl3d6f6575b37beeb9.html?rint=1.

Testing GFCI Outlets, The Family Handyman, Feb. 2007, 3 pgs, http://vvww.familyhandyman.com/electrical/wiring-outlets/testing-gfci-outlets/print.

\* cited by examiner

DEVICES AND METHODS FOR PROTECTING UNATTENDED CHILDREN IN THE HOME

RELATED APPLICATIONS

This application is a continuation of U.S. application Ser. No. 14/675,642, filed Mar. 31, 2015, entitled "Devices and Methods for Protecting Unattended Children in the Home," which is hereby incorporated by reference in its entirety.

TECHNICAL FIELD

This relates generally to protecting children in a home or other dwelling by disabling potential hazards and/or by providing child-protection alerts.

BACKGROUND

Various elements in a home or other dwelling, such as unused electrical outlets, may present a hazard to young children and other vulnerable persons. Typically, these hazards are avoided by not leaving children unattended in the first place. However, there may be situations where children are left unattended within the home due to circumstances beyond a parent or guardian's control. In these situations, the parent or guardian may not have had the opportunity to make safe those potentially hazardous elements, thus putting the unattended children at risk.

SUMMARY

Accordingly, there is a need for improved devices and methods for protecting unattended children in a home or other structure. Such devices and methods optionally complement or replace conventional methods for protecting unattended children in a home or other structure.

In accordance with some embodiments, a method is performed at a computing system. The method includes receiving occupancy data for a room in a dwelling from one or more sensors in the room. The room includes one or more unused electrical outlets and/or one or more electronically-controlled door handles. Whether a predetermined child-protection condition is met is determined based at least in part on the received occupancy data for the room. In accordance with a determination that the predetermined child-protection condition is met, at least one of the one or more unused electrical outlets and/or at least one of the one or more electronically-controlled door handles in the room are disabled, or instructions to disable same are sent.

In accordance with some embodiments, a computing system includes one or more processors and memory. The memory stores one or more programs configured to be executed by the one or more processors. The one or more programs include instructions for performing the operations of any of the methods described above. In accordance with some embodiments, a non-transitory computer readable storage medium has stored therein instructions which when executed by a computing system with one or more processors, cause the computing system to perform the operations of any of the methods described above. In accordance with some embodiments, a computing system includes means for performing the operations of any of the methods described above.

Thus, computing systems are provided with improved methods for protecting unattended children in the home, thereby increasing the effectiveness, efficiency, and user satisfaction with such systems. Such methods may complement or replace conventional methods for protecting unattended children in the home.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

As noted above, there is a need for improved devices and methods for protecting unattended children in the home or other structure. Here, a computing system disables, or sends instructions to disable, unused electrical outlets and/or door handles in a room in a dwelling in response to a determination that a child-protection condition has been met. This determination is based at least in part on occupancy data for the room. The occupancy data may indicate, for example, that a child is alone in a room for at least some amount of time. A safety hazard thus exists that merits disabling of the unused electrical outlets and/or door handles in the room.

Furthermore, the computing system may adjust the child-protection condition used to determine whether to disable the unused outlets/door handles based on feedback from requests to cancel the disablements of the unused outlets/door handles. For example, if an occupant's request to cancel a disablement is of a type that indicates that the disablement is a false alarm, the child-protection condition may be changed to reduce the likelihood of another false alarm (e.g., lengthening the amount of time that a child is alone in the room before disabling the unused outlets/door handles). Conversely, if an occupant's request to cancel a disablement is of a type that indicates that the disablement was proper, but should have been given sooner, the child-protection condition may be changed to shorten the amount of time that a child is alone in the room before disabling the unused outlets/door handles. Thus, the child-protection condition changes with time so that more accurate disablements are performed, with fewer instances of unneeded disablements or late disablements.

Furthermore, the computing system may generate a child-protection alert in response to a determination that a child-protection alert condition has been met. The child-protection alert condition may the same as, or different from, the child-protection condition that triggers disablement of the unused outlets/door handles. The computer system may also, analogous to the adjustment of the child-protection condition, adjust the condition used to determine whether to provide a child-protection alert based on feedback from requests to cancel the child-protection alerts. Thus, the child-protection alert condition changes with time so that more accurate child-protection alerts are provided, with fewer instances of unneeded alerts or late alerts.

Figure 5A:
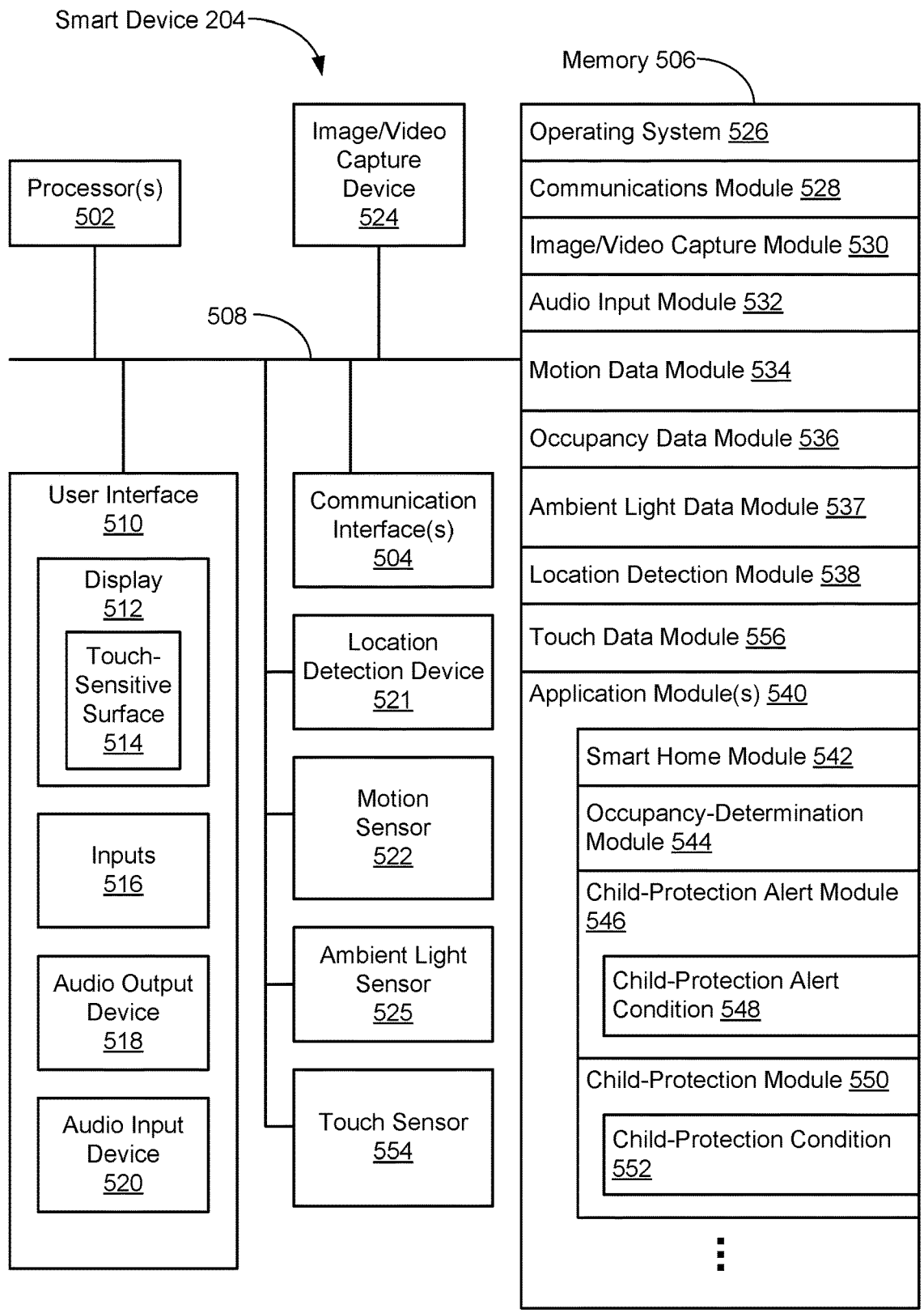
FIGS. 5A-5C are block diagrams illustrating exemplary smart devices in accordance with some embodiments.
Figure 5B:
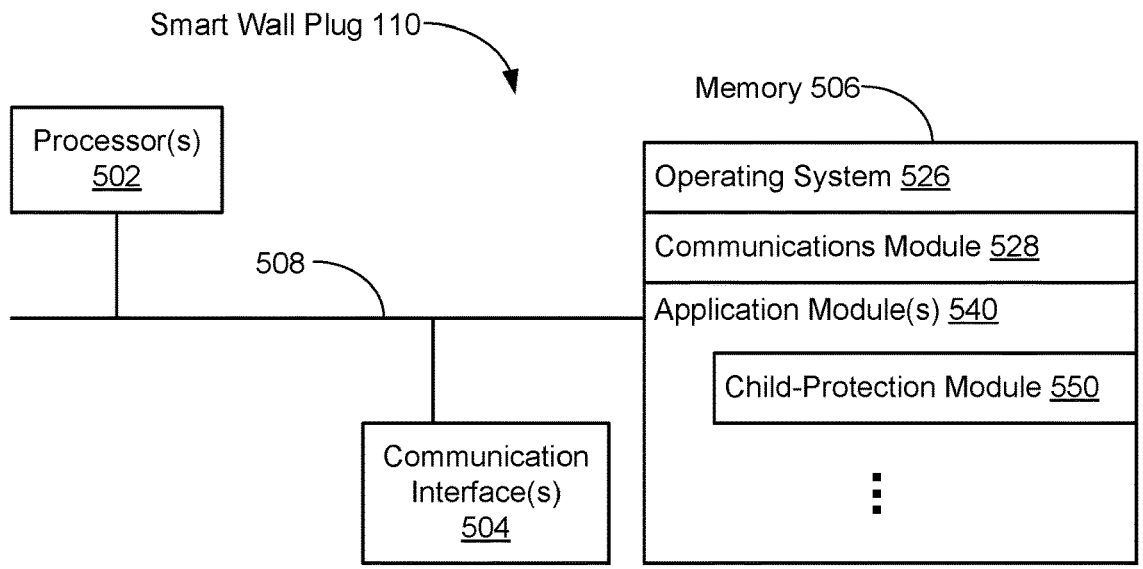
Figure 6:
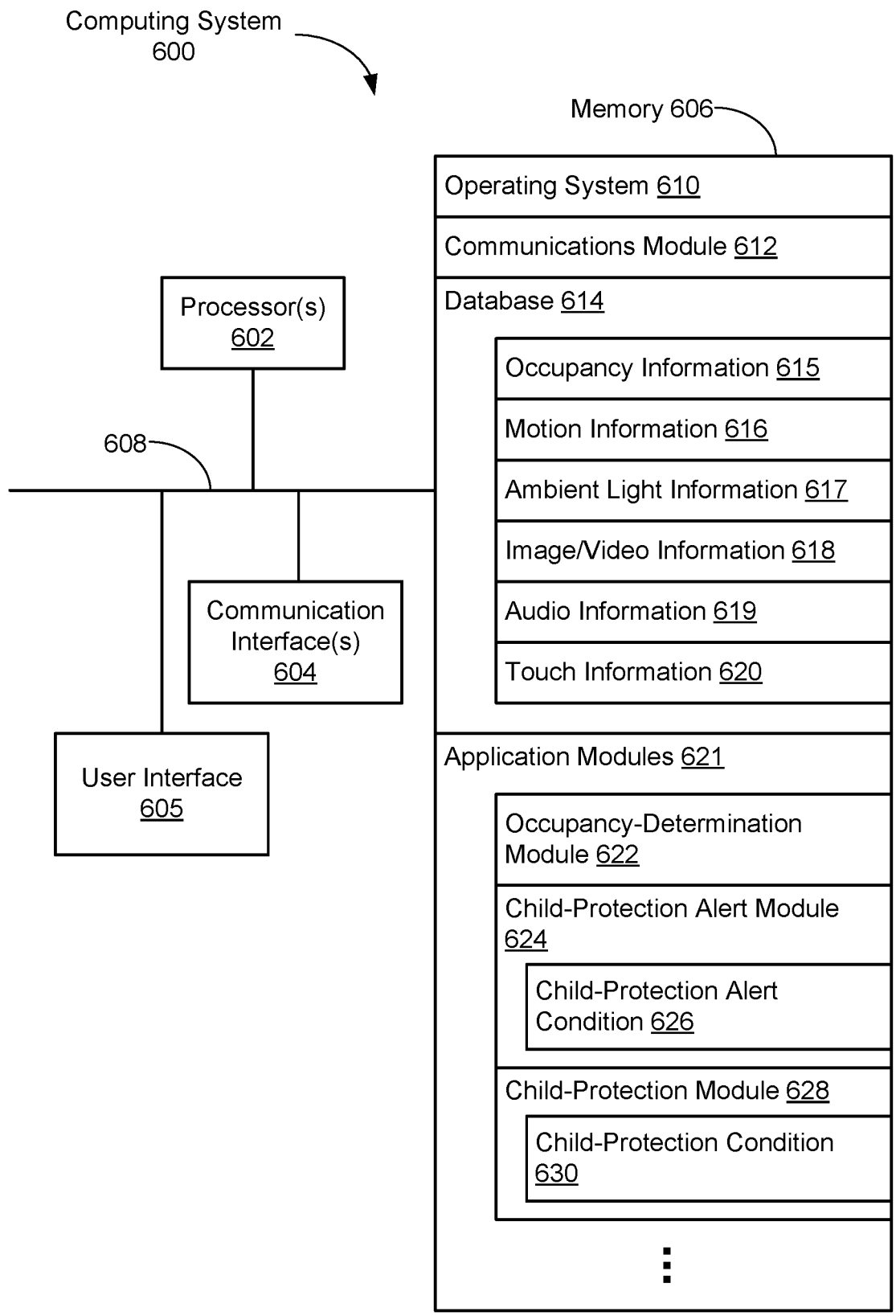
FIG. 6 is a block diagram illustrating an exemplary computing system in accordance with some embodiments.
Figure 7:
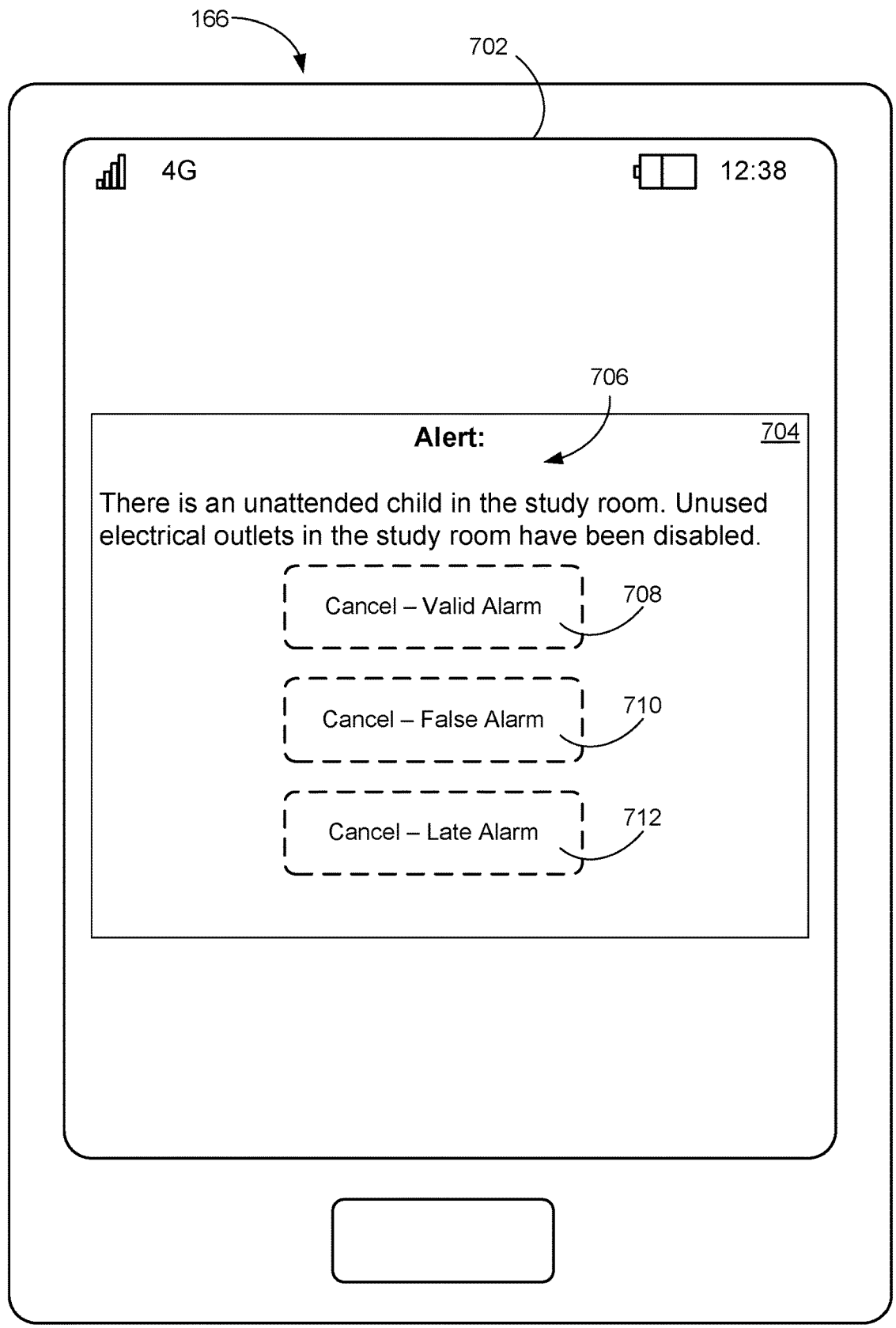
FIG. 7 illustrates an exemplary graphical user interface shown on an electronic device in accordance with some embodiments.

Below, FIGS. 1-4 provide an overview of exemplary smart home device networks and capabilities. FIGS. 5A-6 are block diagrams of electronic devices included in or in communication with a smart home environment. FIG. 7 illustrates an exemplary user interface for displaying information relating to child-protection alerts and alerts informing a user of disablement of potential hazards. FIGS. 8 and 9A-9C are flow diagrams illustrating methods of disabling potential hazards and/or providing child-protection alerts in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first type of request could be termed a second type of request, and, similarly, a second type of request could be termed a first type of request, without departing from the scope of the various described embodiments. The first type of request and the second type of request are both types of requests, but they are not the same type of request.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments, such identity should not be construed in the descriptions that follow as necessarily limiting the scope of the present teachings to those particular individuals having those particular identities.

Figure 1:
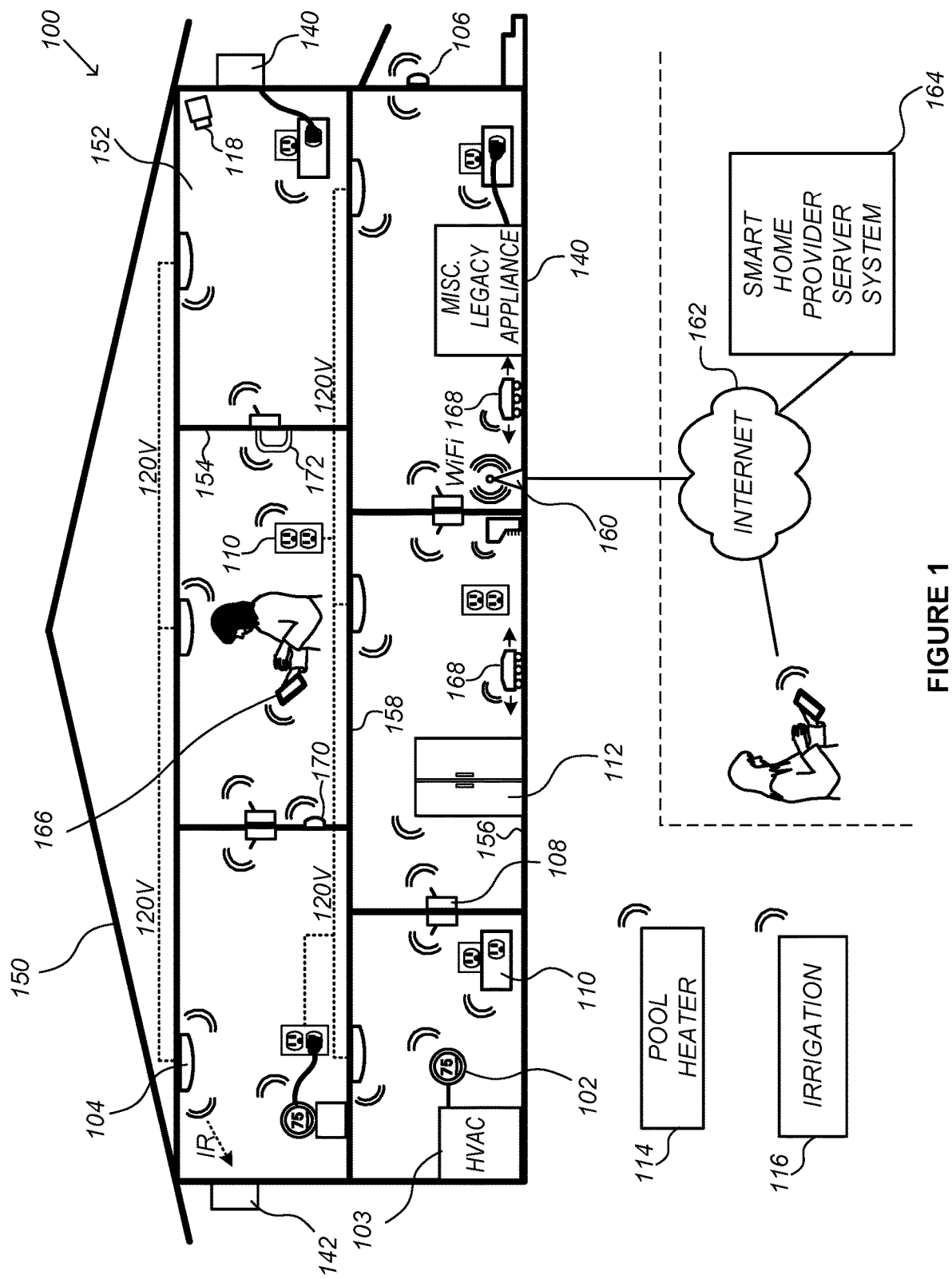
FIG. 1 is an exemplary smart home environment in accordance with some embodiments.

FIG. 1 is an exemplary smart home environment 100 in accordance with some embodiments. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some embodiments, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106").

In some embodiments, the one or more smart thermostats 102 detect ambient climate characteristics (e.g., temperature and/or humidity) and control a HVAC system 103 accordingly. For example, a respective smart thermostat 102 includes an ambient temperature sensor.

In some embodiments, the one or more smart hazard detectors 104 may detect the presence of a hazardous substance or a substance indicative of a hazardous substance (e.g., smoke, fire, and/or carbon monoxide). In some embodiments, the one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some embodiments, the smart home environment 100 includes one or more network-connected, electrically-controlled, and optionally intelligent and/or multi-sensing, door handles 172 (hereinafter referred to as "smart door handles 172"). Smart door handle 172 may be mounted on any type of door, including but not limited to swinging doors (e.g., a door between two adjacent rooms 152), sliding doors (e.g., a sliding glass door between a room and a balcony), and folding doors (e.g., a folding door between a room and a patio). In some embodiments, a smart door handle 172 is also intelligent and/or multi-sensing (e.g., the smart door handle 172 includes sensors to detect touch and pressure from pulling or pushing by an occupant). In some embodiments, a smart door handle 172 enables or disables itself in accordance with detection of conditions that satisfy one or more specified criteria and/or instructions transmitted from another device or system (e.g., one or more occupancy detection devices, a smart home controller, a smart home provider server system 164). It should be appreciated that while smart door handles 172 are described as handles in this specification, smart door handles 172 also includes other door operation mechanisms (e.g., a door knob, finger pull, door locking system, etc.) that are network-connected and electrically-controlled, and optionally intelligent and/or multi-sensing.

In some embodiments, the smart home environment 100 includes one or more intelligent, multi-sensing, network-connected wall switches 108 (hereinafter referred to as "smart wall switches 108"), along with one or more intelligent, multi-sensing, network-connected wall plug or socket interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan.

The smart wall plugs 110 may detect occupancy of a room or enclosure and control supply of power to one or more wall plugs/sockets (e.g., such that power is not supplied to the plug/socket if nobody is at home or if one or more children or other vulnerable persons are left unattended in a room with the wall plug). In some embodiments, a smart wall plug 110 controls supply of power to one or more wall plugs/sockets (including itself) in accordance with detection of conditions that satisfy one or more specified criteria and/or instructions transmitted from another device or system (e.g., one or more occupancy detection devices, a smart home controller, a smart home provider server system 164).

In some embodiments, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some embodiments, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some embodiments, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors or occupancy detection devices. For example, video captured by the cameras 118 may be processed to identify the presence of an occupant in the structure 150 (e.g., in a particular room 152). Specific individuals and/or categories of individuals (e.g., adult, child, etc.) may be identified based, for example, on their appearance (e.g., height, face) and/or movement (e.g., their walk/gate). The smart home environment 100 may additionally or alternatively include one or more other occupancy sensors or occupancy detection devices (e.g., the smart doorbell 106, smart doorlocks, touch screens, IR sensors, microphones, ambient light sensors, motion detectors or sensors, smart nightlights 170, optical sensors, audio sensors, touch sensors, etc.). In some embodiments, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104. In some embodiments, the various sensors and devices that detect or determine occupancy generate occupancy data and transmit the occupancy data to other devices (e.g., a smart home controller, other smart device) in the smart home environment 100 or to the smart home provider server system 164. The occupancy data includes one or more of: motion data, video audio data, touch data, and RFID presence data.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a mobile phone, such as a smart phone) 166. A webpage or application may be configured to receive communications from the user and control the device based on the communications and/or to present information about the device's operation to the user. For example, the user may view a current set point temperature (e.g., a stove) for a device and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment 100 may "learn" who is an occupant and permit the devices 166 associated with those individuals to control the smart devices of the home.

In some embodiments, one or more specific occupants are registered with the smart home environment 100 and categorized. For example, an occupant may be registered and assigned to one or more occupant categories (e.g., adult, child, disabled, elderly, etc.). The registration of an occupant may include detection by a camera 118 and corresponding data input using a device 166 to identify and categorize the occupant. The cameras 118 and other occupancy sensors and occupancy detection devices may be used to detect the specific occupants.

In some embodiments, in addition to containing processing and sensing capabilities, devices 102, 104, 106, 108, 110, 112, 114, 116, 118, 170, and/or 172 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some embodiments, the smart devices serve as wireless or wired repeaters. In some embodiments, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some embodiments, a user is able to contact customer support using a smart device itself rather than needing to use other communication means, such as a telephone or Internet-connected computer. In some embodiments, software updates are automatically sent from the smart home provider server system 164 to smart devices (e.g., when available, when purchased, or at routine intervals).

Figure 2:
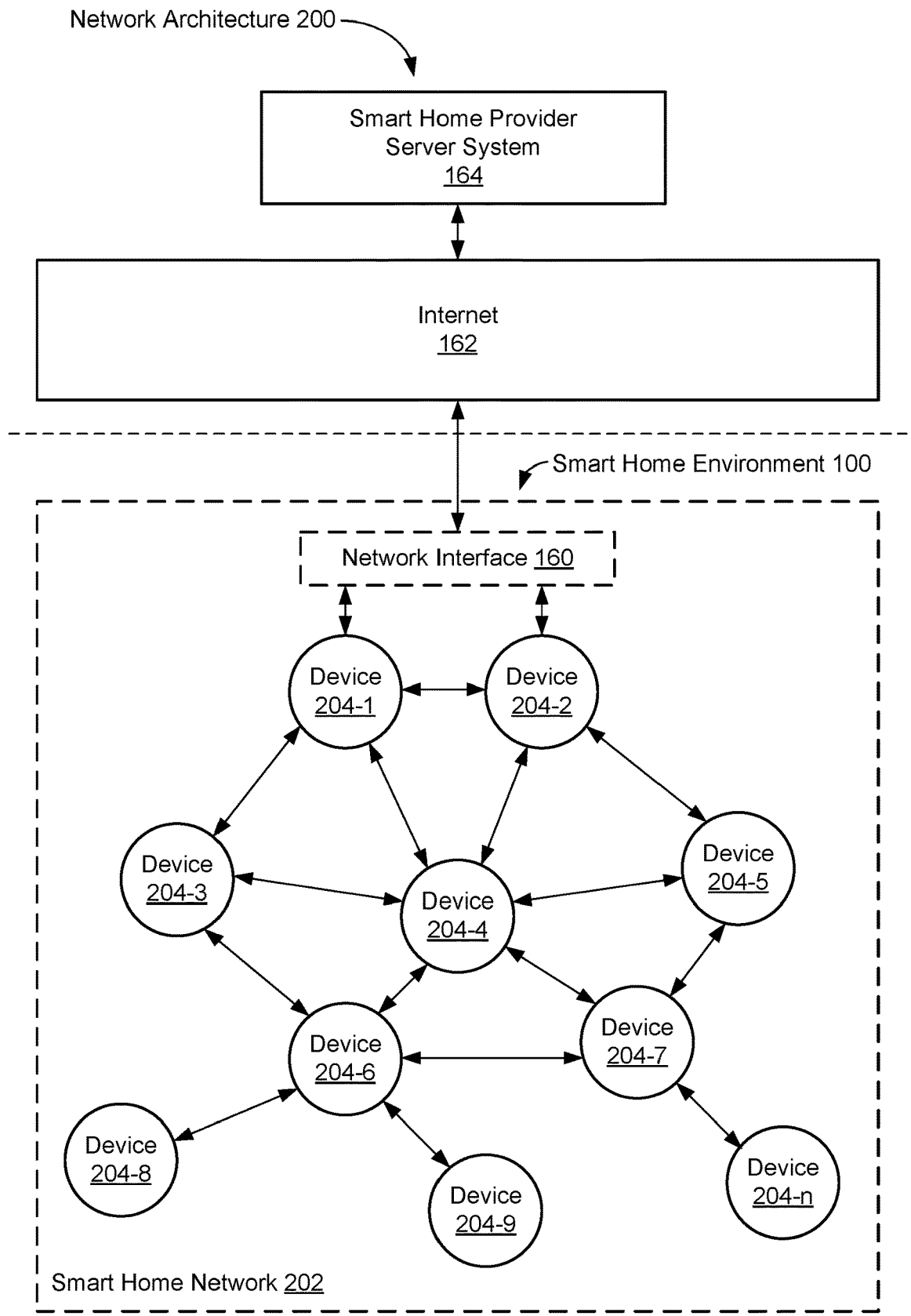
FIG. 2 is a block diagram illustrating an exemplary network architecture that includes a smart home network in accordance with some embodiments.

FIG. 2 is a block diagram illustrating an exemplary network architecture 200 that includes a smart home network 202 in accordance with some embodiments. In some embodiments, the smart devices 204 in the smart home environment 100 (e.g., devices 102, 104, 106, 108, 110, 112, 114, 116, 118, 170, and/or 172) combine to create a mesh network in smart home network 202. In some embodiments, one or more smart devices 204 in the smart home network 202 operate as a smart home controller. In some embodiments, a smart home controller has more computing power than other smart devices. In some embodiments, a smart home controller processes inputs (e.g., from smart devices 204, electronic device 166, occupancy sensors, occupancy detection devices, and/or smart home provider server system 164) and sends commands (e.g., to smart devices 204 in the smart home network 202) to control operation of the smart home environment 100. In some embodiments, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some embodiments, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some embodiments, some low-power nodes are incapable of bidirectional communication. These low-power nodes send messages, but they are unable to "listen". Thus, other devices in the smart home environment 100, such as the spokesman nodes, cannot send information to these low-power nodes.

In some embodiments, some low-power nodes are capable of only a limited bidirectional communication. For example, other devices are able to communicate with the low-power nodes only during a certain time period.

As described, in some embodiments, the smart devices serve as low-power and spokesman nodes to create a mesh network in the smart home environment 100. In some embodiments, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some embodiments, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some embodiments, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some embodiments, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, in some embodiments, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above. In some embodiments, smart wall plugs 110 and/or smart door handles 172 are also low-power nodes or may operate in a low-power mode.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some embodiments, the smart home environment 100 includes service robots 168 (FIG. 1) that are configured to carry out, in an autonomous manner, any of a variety of household tasks.

Figure 3:
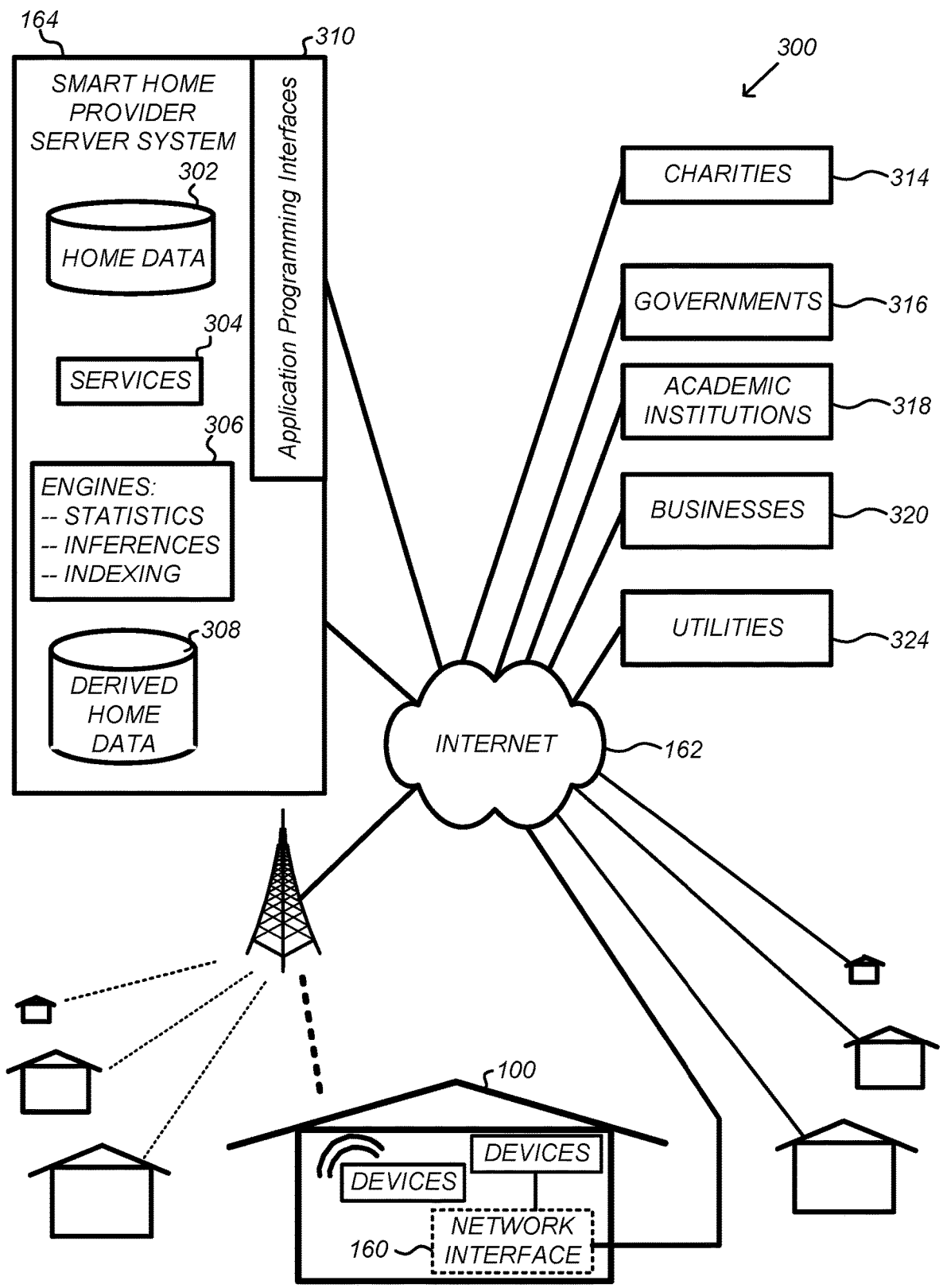
FIG. 3 illustrates a network-level view of an extensible devices and services platform with which the smart home environment of FIG. 1 is integrated, in accordance with some embodiments.

FIG. 3 illustrates a network-level view of an extensible devices and services platform with which the smart home environment of FIG. 1 is integrated, in accordance with some embodiments. The extensible devices and services platform 300 includes smart home provider server system 164. Each of the intelligent, network-connected devices described with reference to FIG. 1 (e.g., 102, 104, 106, 108, 110, 112, 114, 116, 118, and 172, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some embodiments, the devices and services platform 300 communicates with and collects data from the smart devices of the smart home environment 100. In addition, in some embodiments, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Exemplary collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some embodiments, the smart home provider server system 164 provides one or more services 304 to smart homes and/or third parties. Exemplary services 304 include, without limitation, software updates, customer support, sensor data collection/logging, remote access, remote or distributed control, and/or use suggestions (e.g., based on collected home data 302) to improve performance, reduce utility cost, increase safety, etc. In some embodiments, data associated with the services 304 is stored at the smart home provider server system 164, and the smart home provider server system 164 retrieves and transmits the data at appropriate times (e.g., at regular intervals, upon receiving a request from a user, etc.).

In some embodiments, the extensible devices and services platform 300 includes a processing engine 306, which may be concentrated at a single server or distributed among several different computing entities without limitation. In some embodiments, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some embodiments, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some embodiments, use statistics, use statistics relative to use of other devices, use patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some embodiments, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some embodiments, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to pre-emptively service faulty equipment, to prepare for high service demands, to track past service performance, etc., and/or to perform other beneficial functions or tasks.

Figure 4:
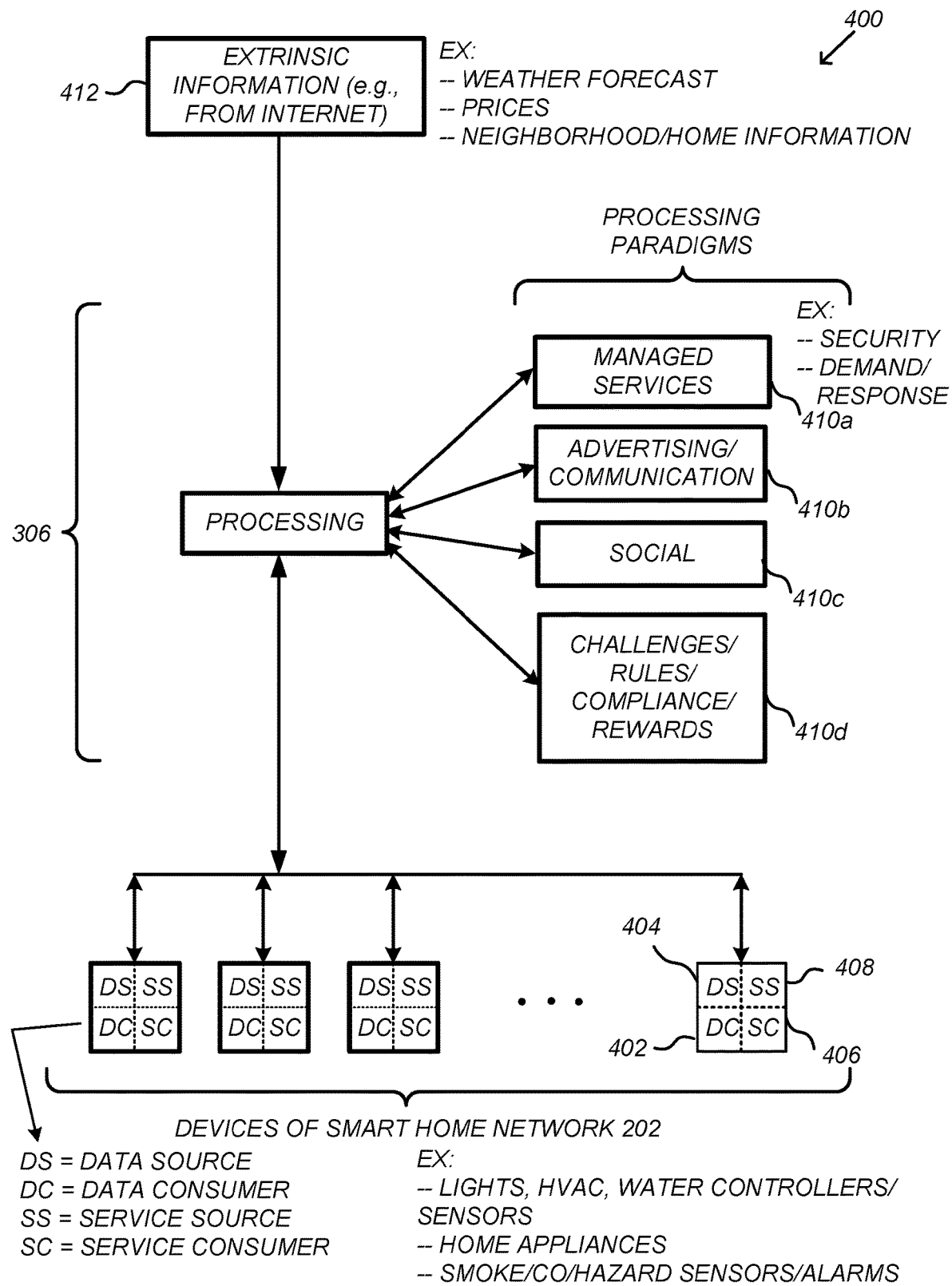
FIG. 4 illustrates an abstracted functional view of the extensible devices and services platform of FIG. 3, with reference to a processing engine as well as devices of the smart home environment, in accordance with some embodiments.

FIG. 4 illustrates an abstracted functional view 400 of the extensible devices and services platform 300 of FIG. 3, with reference to a processing engine 306 as well as devices of the smart home environment, in accordance with some embodiments. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some embodiments, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, enabling or disabling a smart wall plug 110, enabling or disabling a smart door handle 172, providing a child-protection alert, and/or alerting a user of a current or predicted future event or characteristic. In some embodiments, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some embodiments, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some embodiments, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of child-protection alerts, reducing occurrences of disablement of a wall plug 110 or a smart door handle 172) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some embodiments, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

FIG. 5A is a block diagram illustrating an exemplary smart device 204 in accordance with some embodiments (e.g., a smart wall plug 110 or a smart door handle 172). The smart device 204 typically includes one or more processing units (processors or cores) 502, one or more network or other communications interfaces 504, memory 506, and one or more communication buses 508 for interconnecting these components. The communication buses 508 optionally include circuitry (sometimes called a chipset) that interconnects and controls communications between system components. In some embodiments, the smart device 204 includes a user interface 510. The user interface 510 may include a display device 512. In some embodiments, the device 204 includes one or more inputs 516 (e.g., input buttons, a keyboard, a mouse, and/or other input). In some embodiments, the smart device 204 includes a 3D gesture sensor for touchless gesture control. Alternatively or in addition, in some embodiments, the display device 512 includes a touch-sensitive surface 514, in which case the display device 512 is a touch-sensitive display. In some embodiments, the user interface 510 also includes an audio output device 518, such as speakers or an audio output connection connected to speakers, earphones, or headphones. Furthermore, some smart devices 204 use a microphone and voice recognition to supplement or replace the keyboard. Optionally, the smart device 204 includes an audio input device 520 (e.g., a microphone) to capture audio (e.g., speech from a user, sounds caused by one or more occupants). Optionally, the smart device 204 includes a location detection device 521, such as a GPS (Global Positioning System), BLE (Bluetooth Low Energy), or other geo-location receiver, for determining the location of the smart device 204. The smart device 204 also optionally includes an image/video capture device 524 (e.g., a camera 118), which may serve as an occupancy sensor.

In some embodiments, the smart device 204 includes one or more motion sensors 522 (e.g., a passive infrared sensor) that detect motion by one or more occupants. In some embodiments, the smart device 204 includes one or more ambient light sensors 525 that measure the ambient light at the location of the smart device 204. In some embodiments, the smart device 204 includes one or more touch sensors 554 (e.g., a touch-sensitive surface separate from the touch-sensitive surface 514 associated with the display 512) to detect touch and/or pressure made by occupants (e.g., with the occupants' hands). In some embodiments, the smart device 204 includes other occupancy sensors in addition to or as an alternative to the image/video capture device 524, motion sensor 522, ambient light sensor 525, audio input device 520, and/or touch sensor 554.

Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the processor(s) 502. Memory 506, or alternately the non-volatile memory device(s) within memory 506, includes a non-transitory computer readable storage medium. In some embodiments, memory 506 or the computer readable storage medium of memory 506 stores the following programs, modules and data structures, or a subset or superset thereof:

an operating system 526 that includes procedures for handling various basic system services and for performing hardware dependent tasks;

a network communication module 528 that is used for connecting the smart device 204 to other computers via the one or more communication network interfaces 504 (wired or wireless) and one or more communication networks, such as smart home network 202 (e.g., a mesh network), the Internet, cellular telephone networks, mobile data networks, other wide area networks, local area networks, metropolitan area networks, and so on;

an image/video capture module 530 (e.g., a camera module) for processing a respective image or video captured by the image/video capture device 524, where the respective image or video may be sent or streamed (e.g., by a client application module 540) to the smart home network 202 and/or smart home provider server system 164;

an audio input module 532 (e.g., a microphone module) for processing audio captured by the audio input device 520, where the respective audio may be sent or streamed (e.g., by a client application module 540) to the smart home network 202 and/or smart home provider server system 164;

a motion data module 534 for processing motion data (e.g., passive infrared data) captured by the motion sensor 522, where the data may be sent or streamed through the smart home network 202 to a portable electronic device 166, smart home provider server system 164, other smart device 204, and/or other computing system;

an occupancy data module 536 for processing data captured by the image/video capture device 524, audio input device 520, motion sensor 522, ambient light sensor 525, and/or other occupancy sensors, where the data may be sent or streamed through the smart home network 202 to a portable electronic device 166, smart home provider server system 164, other smart device 204, and/or other computing system;

an ambient light data module 537 for processing data captured by the ambient light sensor 525, where the data may be sent or streamed through the smart home network 202 to a portable electronic device 166, smart home provider server system 164, other smart device 204, and/or other computing system;

a location detection module 538 (e.g., a GPS, Wi-Fi, or hybrid positioning module) for determining the location of the smart device 204 (e.g., using the location detection device 522) and providing this location information to the smart home network 202 and/or smart home provider server system 164;

a touch data module 556 for processing data captured by the touch sensor 554, where the data may be sent or streamed through the smart home network 202 to a portable electronic device 166, smart home provider server system 164, other smart device 204, and/or other computing system; and one or more application modules 540, including the following modules (or sets of instructions), or a subset or superset thereof:
  a smart home module 542 for providing an interface to a smart home application (e.g., a stand-alone application or an application in communication with another device in smart home network 202 and/or smart home provider server system 164) and related features;
  an occupancy-determination module 544 for determining occupancy of a room in the structure 150 in which the smart device 204 is located, and/or respective rooms 152 of the structure 150 (e.g., based on occupancy data received from the image/video capture device 524, audio input device 520, motion sensor 522, ambient light sensor 525, touch sensor 554, and/or other occupancy sensors, and/or other smart devices 204 in different rooms 152);
  a child-protection alert module 546 to provide child-protection alerts based on the occupancy (e.g., as determined by the module 544), in accordance with a child-protection alert condition 548 that may be updated dynamically based on user feedback; and/or
  a child-protection module 550 to disable/enable, to send instructions to disable/enable, and/or to receive instructions to disable/enable a respective smart device 204 (including itself) (e.g., smart wall plug 110, a smart door handle 172) based on the occupancy (e.g., as determined by the module 544) in accordance with a child-protection condition 552 that may be updated dynamically based on user feedback, and/or received instructions to disable/enable.

In some embodiments, a smart device 204 includes a subset of the components and/or modules described above in FIG. 5A. For example, FIG. 5B illustrates a smart wall plug 110 in accordance with some embodiments. The smart wall plug 110 includes processor(s) 502, communication interface(s) 504, communication bus(es) 508, and memory 506. The memory 506 in the smart wall plug 110 stores an operating system 526, communications module 528, and one or more application modules 540 including a child-protection module 550. In some embodiments, the smart wall plug 110 lacks the sensors and modules to detect occupancy, but is still capable of various operations, including receiving instructions to disable/enable itself, to disable/enable itself in accordance with received instructions, and/or send (e.g., forward) instructions to disable/enable.

As another example of a smart device 204 with a subset of the components and/or modules described above in FIG. 5A, FIG. 5C illustrates a smart door handle 172 in accordance with some embodiments. The smart door handle 172 includes processor(s) 502, communication interface(s) 504, communication bus(es) 508, memory 506, and touch sensor 554. The memory 506 in the smart door handle 172 stores operating system 526, communications module 528, touch data module 556, occupancy data module 536, and one or more application modules 540 including occupancy-determination module 544, child-protection alert module 546, child-protection alert condition 548, child-protection module 550, and child-protection condition 552. Thus, the smart door handle 172 is capable of detecting and determining occupancy based on touch, receiving instructions to disable/enable itself, to disable/enable itself in accordance with received instructions, and/or send (e.g., forward, generate based on an occupancy determination) instructions to disable/enable.

Figure 5C:
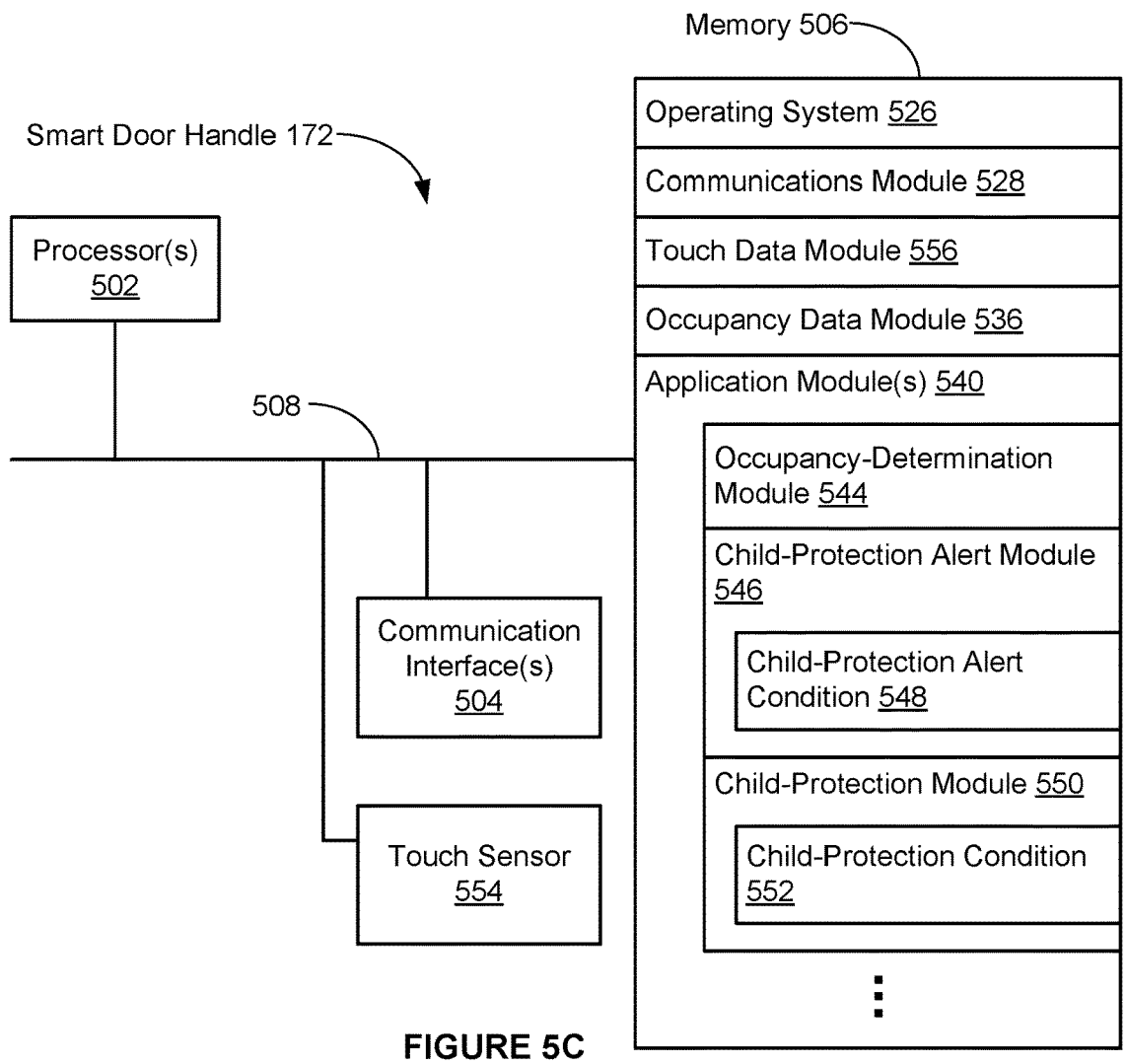

It should be appreciated that the smart wall plug 110 and smart door handle 172 may include more or less components and/or modules than shown in FIGS. 5B-5C, respectively. For example, a smart wall plug 110 may include touch detection capabilities for detecting and determining occupancy based on touch. Such a smart wall plug 110 may include, in addition to the components and modules shown in FIG. 5B, a touch sensor 554, a touch data module 556, an occupancy data module 536, and application modules 540 including occupancy-determination module 544, child-protection alert module 546, child-protection alert condition 548, child-protection module 550, and child-protection condition 552.

FIG. 6 is a block diagram illustrating an exemplary computing system 600 in accordance with some embodiments. In some embodiments, the computing system 600 is a computer or other portable electronic device 166. In some embodiments, the computing system 600 is the smart home provider server system 164 or another server system outside of the structure 150. In some embodiments, the computing system 600 is a stand-alone controller (e.g., located in the structure 150) that is distinct from the smart devices 204 and the smart home provider server system 164. In some embodiments, the computing system 600 is a smart device 204 (e.g., with additional components as shown in FIG. 5A) or a collection of multiple smart devices 204. For example, the computing system 600 may have a housing that contains the components shown in FIG. 6 and also contains a smart wall plug 110 or smart door handle 172, and/or at least one occupancy sensor (e.g., a camera 118, audio input device 520, motion sensor 522, ambient light sensor 525, touch sensor 554, or other occupancy sensor). For example, the computing system 600, a motion sensor, and a smart wall plug 110 are contained in a single enclosure.

The computing system 600 typically includes one or more processing units (processors or cores) 602, one or more network or other communications interfaces 604, memory 606, and one or more communication buses 608 for interconnecting these components. The communication buses 608 optionally include circuitry (sometimes called a chipset) that interconnects and controls communications between system components. In some embodiments, the computing system 600 includes a user interface 605 (e.g., which is analogous to the user interface 510, FIG. 5A).

Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the processor(s) 602. Memory 606, or alternately the non-volatile memory device(s) within memory 606, includes a non-transitory computer readable storage medium. In some embodiments, memory 606 or the computer readable storage medium of memory 606 stores the following programs, modules and data structures, or a subset or superset thereof:

- an operating system 610 that includes procedures for handling various basic system services and for performing hardware-dependent tasks;
- a network communication module 612 that is used for connecting the computing system 600 to other computers via the one or more communication network interfaces 604 (wired or wireless) and one or more communication networks, such as smart home network 202 (e.g., a mesh network), the Internet 162, cellular telephone networks, mobile data networks, other wide area networks, local area networks, metropolitan area networks, and so on;
- a database 614 that includes the following data:
  - occupancy information 615 (e.g., received from occupancy data modules 536 in respective devices 204, FIGS. 5A-5C);
  - motion information 616 (e.g., received from motion data modules 534 in respective devices 204, FIGS. 5A-5C);
  - ambient light information 617 (e.g., received from ambient light modules 537 in respective devices 204, FIGS. 5A-5C);
  - image/video information 618 (e.g., received from image/video capture modules 530 in respective smart devices 204, FIGS. 5A-5C);
  - audio information 619 (e.g., received from audio input modules 532 in respective smart devices 204, FIGS. 5A-5C); and/or
  - touch information 620 (e.g., received from touch data modules 556 in respective smart devices 204, FIGS. 5A-5C).
- one or more application modules 621, including the following modules (or sets of instructions), or a subset or superset thereof:
  - an occupancy-determination module 622 for determining occupancy of the structure 150 and/or respective rooms 152 of the structure 150 (e.g., based on the occupancy information 615, motion information 616, ambient light information 617, image/video information 618, audio information 619, and/or touch information 620 in the database 614);
  - a child-protection alert module 624 to provide child-protection alerts based on occupancy (e.g., as determined by the module 622), in accordance with a child-protection alert condition 626 that may be updated dynamically based on user feedback; and/or
  - a child-protection module 628 to enable or disable, or send instructions to enable/disable, a respective device 204 (FIGS. 5A-5C) based on occupancy (e.g., as determined by the module 622), in accordance with a child-protection condition 630 that may be updated dynamically based on user feedback.

In some embodiments, the computer system 600 includes one or more of: image capture device 524, audio input device 520, motion sensor 522, ambient light sensor 525, touch sensor 554, and/or other occupancy sensors and their respective corresponding modules (e.g., image/video capture module 530, audio input module 532, motion data module 534, ambient light data module 537, and touch data module 556, respectively) and/or occupancy data module 536.

Each of the above identified modules and applications of FIGS. 5A-6 corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 506 and/or 606 store a subset of the modules and data structures identified above. Furthermore, memory 506 and/or 606 optionally store additional modules and data structures not described above.

Attention is now directed towards embodiments of graphical user interfaces ("UI") and associated processes that may be implemented on an electronic device to present child-protection alerts and/or alert a user of disablement of a wall plug or door handle, and allow a user to respond to (e.g., cancel) child-protection alerts and/or disablements.

FIG. 7 illustrates an exemplary GUI 704 displayed on a screen 702 of a portable electronic device 166 (or other computing system, such as a smart device 204) in accordance with some embodiments. The GUI 704 illustrates aspects of operations in the methods 800 (FIG. 8) and 900 (FIGS. 9A-9C). In some embodiments, the screen 702 is an example of a user interface 605 (FIG. 6). In some embodiments, the screen 702 is an example of a display 512 (FIG. 5A) of a smart device 204. In some embodiments, the GUI 704 is generated based on information from a computing system 600 (FIG. 6).

The GUI 704 displays a child-protection alert 706, which in this example indicates that there is a child unattended in a room 152 (e.g., the study room) of the structure 150, and electrical outlets (e.g., smart wall plugs 110) in the study room that are unused (i.e., nothing plugged in) have been disabled (e.g., terminals blocked from physical access, and/or electrical power to the terminals in the outlet is cut off). The GUI 704 also presents user-interface elements 708, 710, and/or 712 that allow the user to cancel the child-protection alert and to cancel the disablement of the electrical outlets (i.e., enable them). Selection of the element 708 (e.g., through an appropriate gesture on the screen 702, such as a tap) cancels the child-protection alert 706 and indicates that the child-protection alert 706 was valid. Selection of the element 710 cancels the child-protection alert 706 and indicates that the child-protection alert 706 was a false alarm. Selection of the element 712 cancels the child-protection alert 706 and indicates that the child-protection alert 706 was valid but was late in being presented. If the child-protection alert 706 was provided by another device (e.g., a computing system 600, FIG. 6) that instructed the portable electronic device 166 to display the child-protection alert 706, user feedback associated with selection of an element 708, 710, or 712 is transmitted to that device (e.g., to the computing system 600). That device may use the user feedback to adjust the child-protection alert condition 548 and/or the child-protection condition 552.

Figure 8:
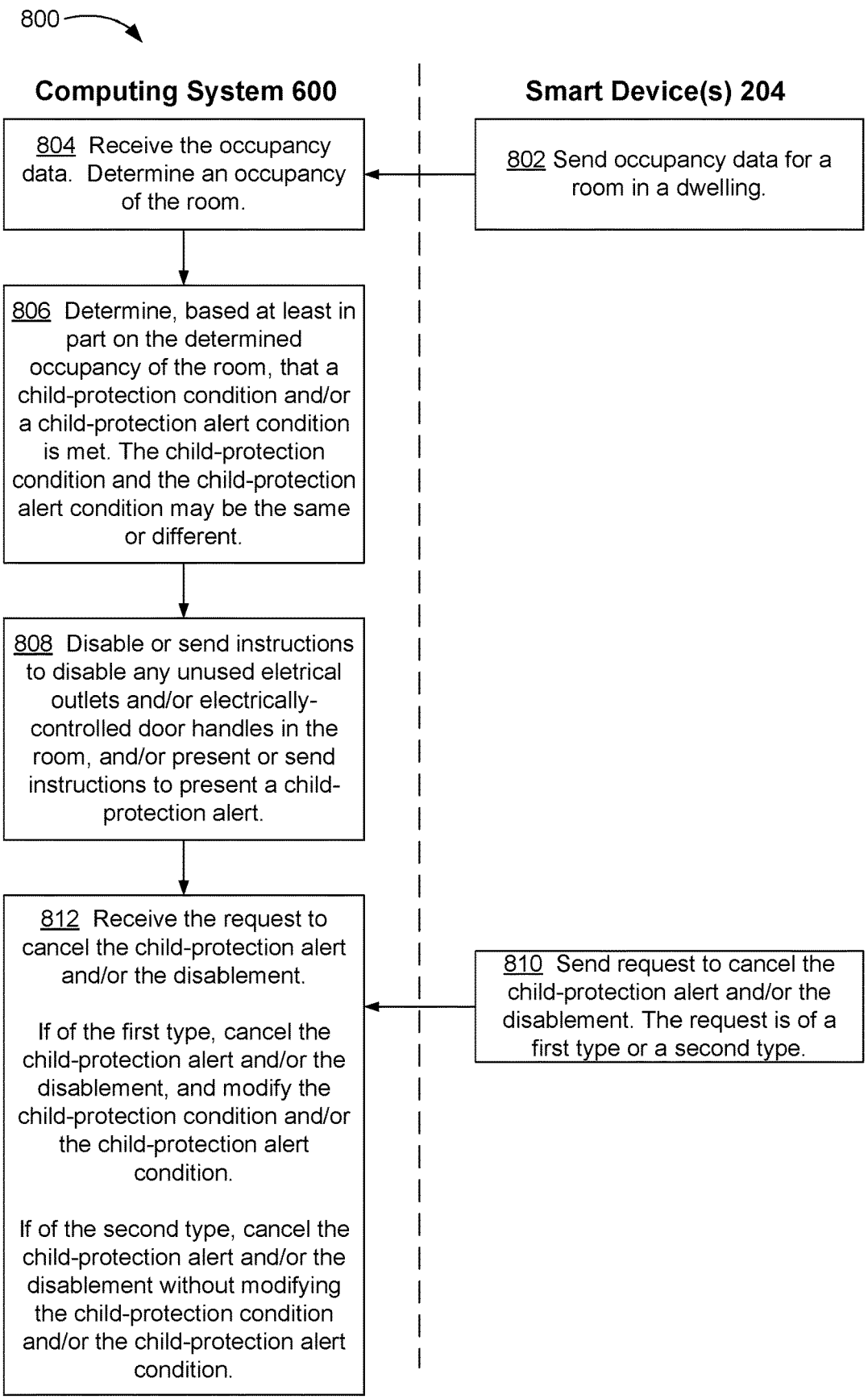
FIGS. 8 and 9A-9C are flow diagrams illustrating methods of disabling potential hazards and/or providing child-protection alerts in accordance with some embodiments.
Figure 9A:
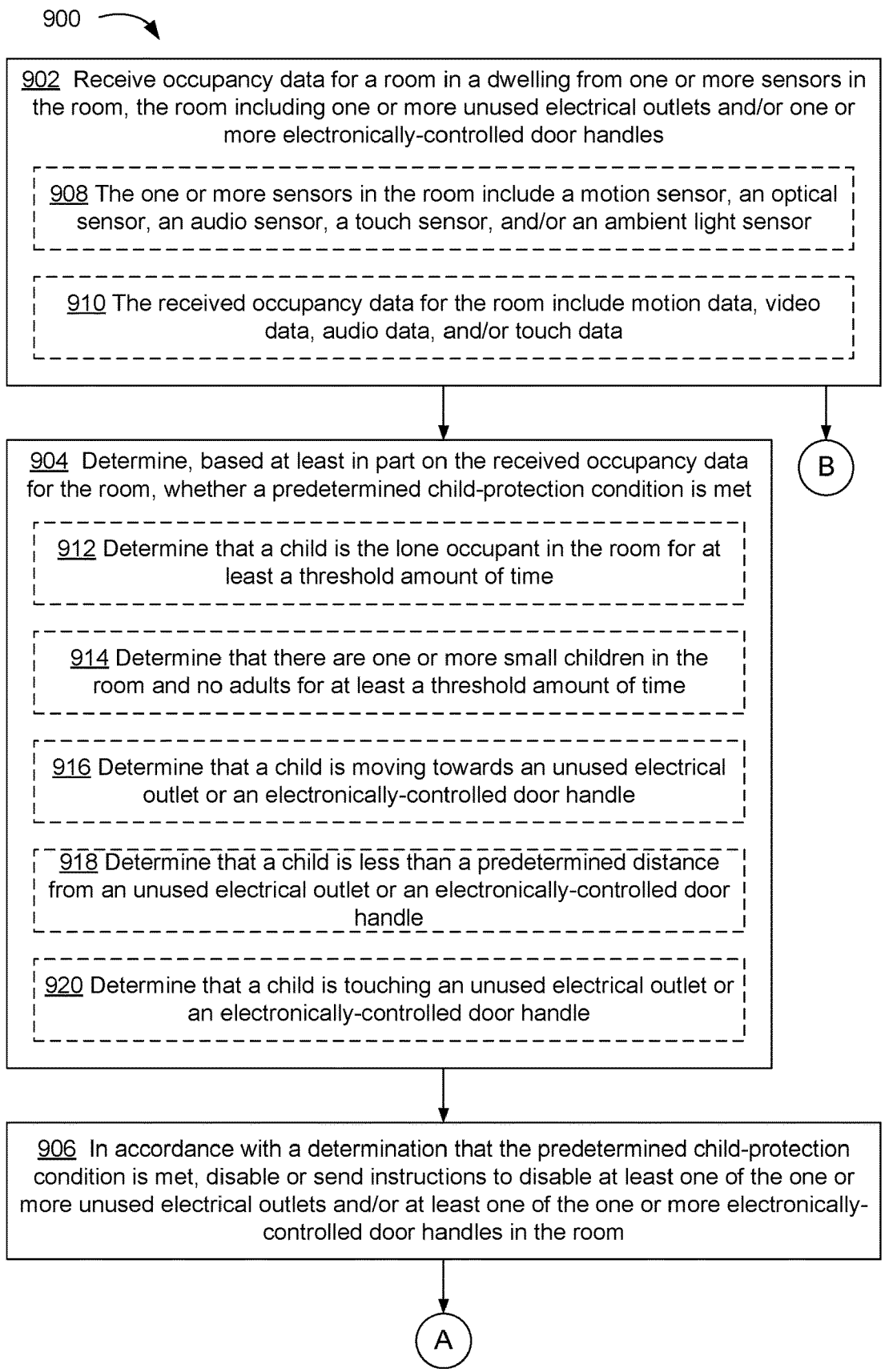
Figure 9B:
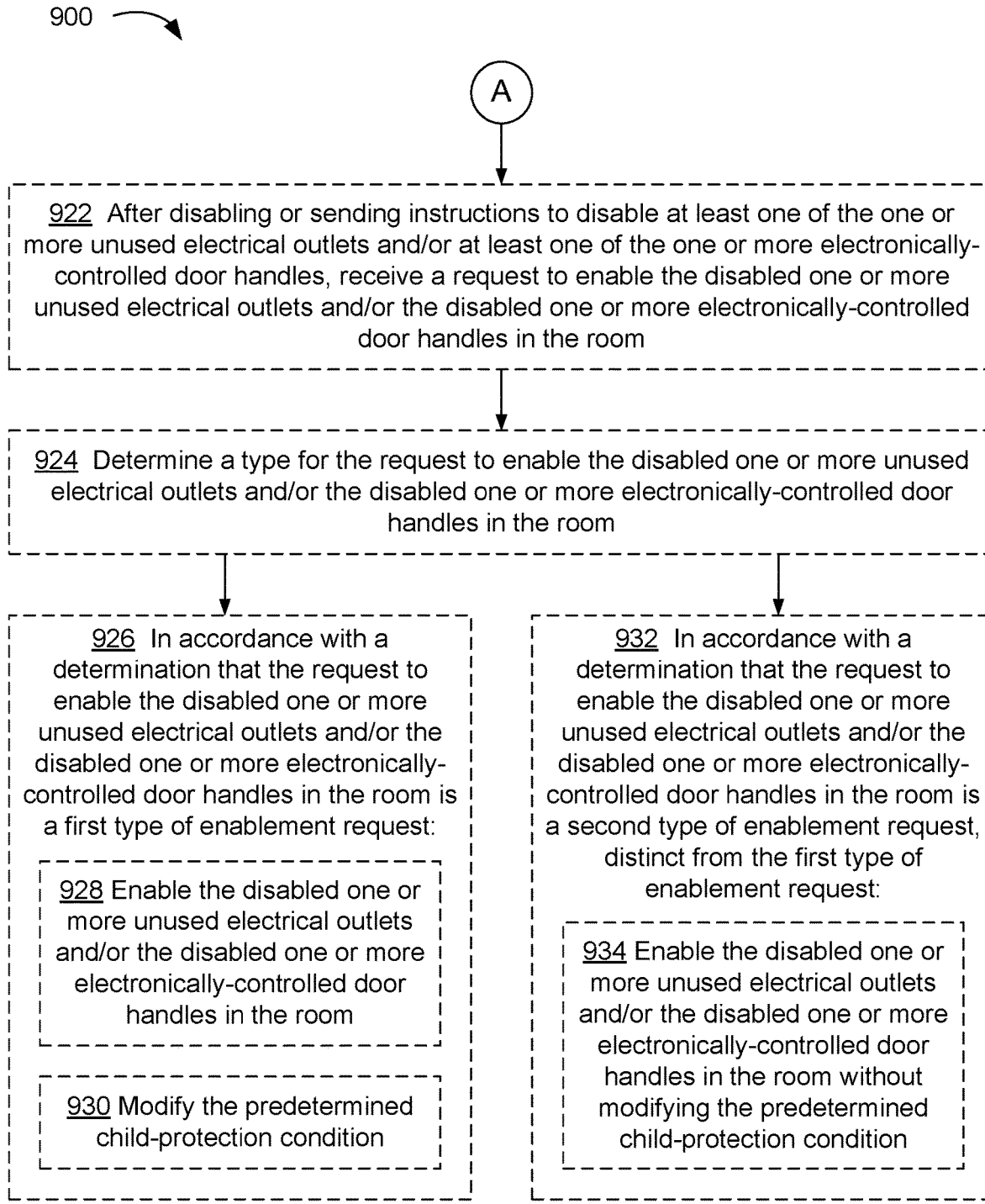
Figure 9C:
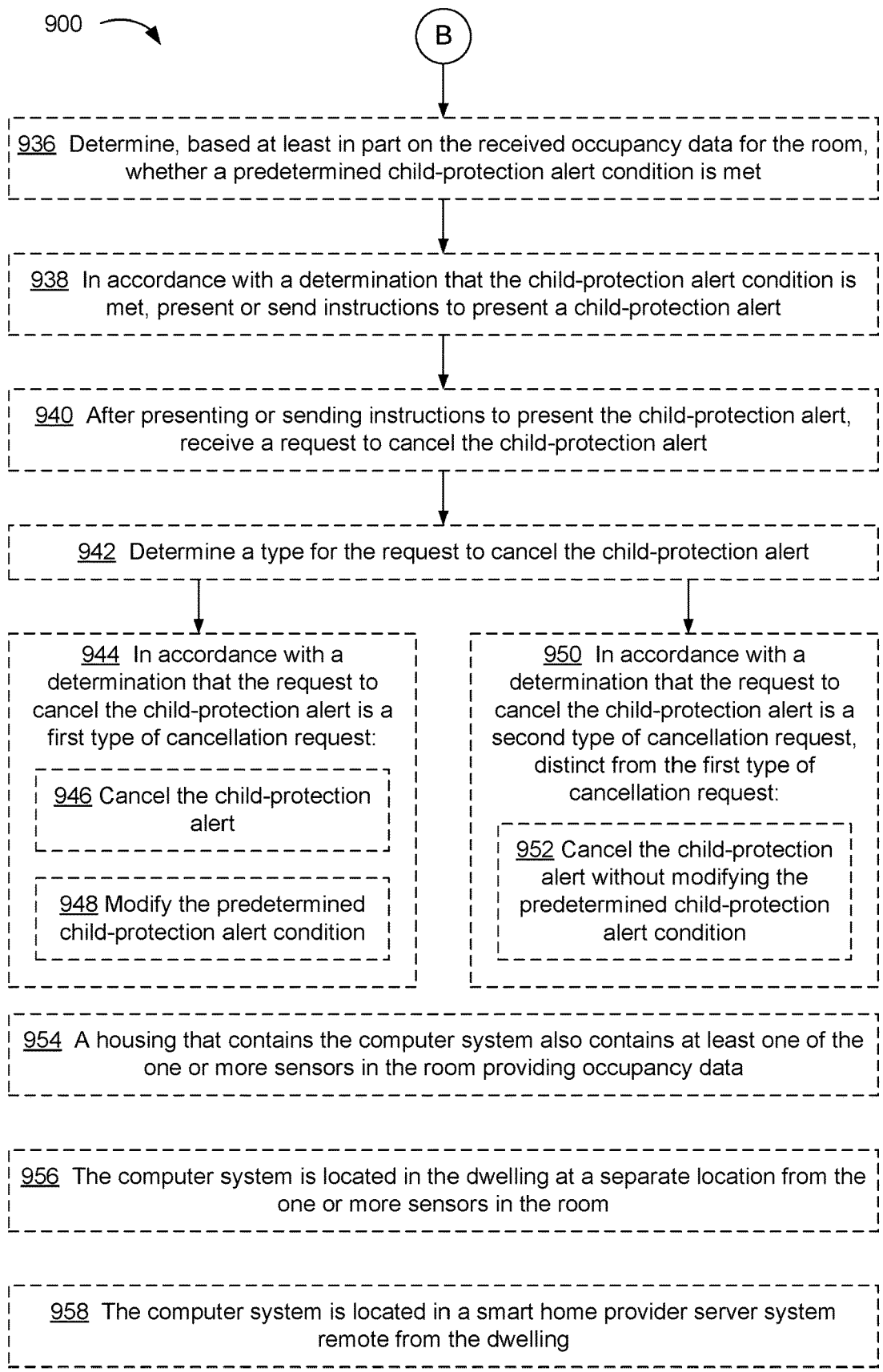

FIG. 8 is a flow diagram illustrating a method 800 of disabling potential hazards in a room and/or providing child-protection alerts in accordance with some embodiments. Respective portions of the method 800 are performed by smart devices 204 (FIGS. 2, 5A-5C) and a computing system 600 (FIG. 6). The method 800 corresponds to instructions stored in one or more non-transitory computer-readable storage media. For example, the portions performed by smart devices 204 correspond to instructions stored in memories 506 (FIGS. 5A-5C) and the portions performed by the computing system 600 correspond to instructions stored in the memory 606 (FIG. 6). Examples and details of the portion of the method 800 performed by the computing system 600 are provided below in the method 900 (FIGS. 9A-9C).

One or more occupancy sensors (e.g., cameras 118, audio input device 520, motion sensor 522, ambient light sensor 525, touch sensor 554, and/or other occupancy sensors) send (802) occupancy data for a room in a dwelling. The computing system 600 receives (804) this data and determines an occupancy of the room. The one or more occupancy sensors thus include an occupancy sensor in the room.

The computing system 600 determines (806) that a child-protection condition and/or a child-protection alert condition are met, based at least in part on the determined occupancy of the room. In some embodiments, the child-protection condition includes a first threshold time, and the child-protection alert condition includes a second threshold time, which may be the same as or different from the first threshold time. In some embodiments, the child-protection condition and the child-protection alert condition are the same. For example, the child-protection condition and/or the child-protection alert condition requires that a child be detected as the lone occupant in the room for at least a specified amount of time. The child-protection condition and the child-protection alert condition thus applies the first threshold time and the second threshold time, respectively, to a specified occupancy state of the room, in accordance with some embodiments. In some embodiments, the specified period of time is measured in minutes (e.g., is in the range of 5-15 minutes).

In response to determining (806) that the child-protection condition is met, the computing system 600 disables (808) or sends instructions to disable unused electrical outlets and/or electrically-controlled door handles in the room. In response to determining (806) that the child-protection alert condition is met, the computing system 600 presents (808) or sends instructions to present a child-protection alert. In some embodiments, the operation 808 includes displaying a flashing light or other visual warning in one or more rooms, sounding an audible warning (e.g., "Your child is approaching an electrical outlet" or "Your child is alone for 10 minutes") in one or more rooms, and/or sending a notification (e.g., a text message or email) to one or more occupants of the structure or to a third party (e.g., a caregiver of an occupant or a home security provider). The child-protection alert 706 (FIG. 7) is an example of such a notification.

An electronic device (e.g., a portable electronic device 166 or smart device 204) sends (810) a request to cancel disablement of the electrical outlets and door handles, and/or the child-protection alert, based on a corresponding user input (e.g., a user input provided through the touch-sensitive surface 514 or an input 516, FIG. 5A). Alternatively, the user input is provided directly to the computing system 600, through an input device of the computing system 600 (e.g., through a user interface 605).

The request may be of a first type or a second type. In some embodiments, a request of the first type results from a first type of activation of a cancel button or touch-sensitive surface, while a request of the second type results from a second type of activation of the cancel button or touch-sensitive surface. For example, the first type of activation of the cancel button or touch-sensitive surface is a press-and-hold or double-tap gesture, while the second type of activation of the cancel button or touch-sensitive surface is a single-tap gesture (or vice versa). In another example, the first type of activation is selection of the user-interface element 710 or 712 (FIG. 7), while the second type of activation is selection of the user-interface element 708 (FIG. 7). In some embodiments, requests result from touch-less user gestures: a request of the first type results from a first type of user gesture in the air (e.g., a wave) while a request of the second type results from a second type of user gesture in the air (e.g., a thumbs-up gesture). In some embodiments, a request of the first type results from a first type of voice command (e.g., a user says "false alarm" or "late alarm") while a request of the second type results from a second type of voice command (e.g., a user says "cancel"). In some embodiments, valid voice commands are limited to voice commands provided by an occupant who is determined to be in the same room or structure as the detected child(ren).

The computing system 600 receives (812) the request. If the request is of the first type, the computing system 600 cancels (812) the child-protection alert and modifies the child-protection condition and/or the child-protection alert condition. Examples of modifying the child-protection condition and/or the child-protection alert condition are provided below with respect to operation 930 and 948 (FIGS. 9B, 9C) of the method 900. If the request is of the second type, the computing system 600 cancels (816) the child-protection alert without modifying the child-protection condition and the child-protection alert condition.

FIGS. 9A-9C are flow diagrams illustrating a method 900 of disabling potential hazards and/or providing child-protection alerts in accordance with some embodiments. The method 900 is performed by a computing system 600 (FIG. 6) and corresponds to instructions stored in a non-transitory computer-readable storage medium (e.g., memory 606, FIG. 6).

The computer system 600 receives (902) occupancy data (e.g. information 615 thru 620, FIG. 6), for a room in a dwelling from one or more sensors in the room. The room includes one or more unused electrical outlets and/or one or more electronically-controlled door handles. A dwelling (e.g., structure 150) includes a room 152 that includes one or more electrical outlets (e.g., wall plug(s) 110) that are unused and one or more electrically-controlled door handles (e.g., smart door handle 172). The room also includes 152 one or sensors on one or more smart devices 204 (e.g., wall plugs 110, smart door handle 172, camera 118, etc.).

In some embodiments, an electrical outlet is unused if no power cord is plugged into the electrical outlet. In some embodiments, whether an electrical outlet is used may be considered for the outlet as a whole or per socket. For example, if viewing the outlet as a whole, the outlet is considered unused if any of the sockets is open (i.e., no power cord plugged into that socket). If viewing the outlet on a per-socket basis, then a socket of the outlet is unused if no power cord is plugged into that socket, but a socket with a power cord plugged in is considered to be used. An unused electrical outlet poses a potential electrical shock hazard to children and other vulnerable persons.

In some embodiments, the one or more sensors in the room include (908) a motion sensor (e.g., a passive IR sensor) (e.g., motion sensor 522), an optical sensor (e.g., a video camera) (e.g., camera 118, image/video capture device 524), an audio sensor (e.g., a microphone) (e.g., audio input device 520), a touch sensor (e.g., a touch-sensitive surface on or near an unused electrical outlet or an electronically-controlled door handle) (e.g., touch sensor 554), and/or an ambient light sensor (e.g., ambient light sensor 525).

In some embodiments, the received occupancy data for the room include (910) motion data (e.g., data from a motion sensor), video data (e.g., data from an optical sensor), audio data (e.g., data from an audio sensor), and/or touch data (e.g., data from a touch sensor).

The computer system 600 determines (904), based at least in part on the received occupancy data for the room, whether a predetermined child-protection condition is met. For example, the occupancy-determination module 622 analyzes the information 615-620, and determines whether a child-protection condition (e.g., child-protection condition 552) is met based on the analysis.

In some embodiments, determining, based at least in part on the received occupancy data for the room, whether the predetermined child-protection condition is met includes: determining (912) that a child (e.g., a crawling baby, toddler, a child whose height is less than a threshold value, or a person previously identified as a child to the computer system while the computer system is in a settings mode) is the lone occupant in the room for at least a threshold amount of time (e.g., based on video data for the room); determining (914) that there are one or more small children in the room and no adults for at least a threshold amount of time (e.g., based on video data for the room); determining (916) that a child is moving towards an unused electrical outlet or an electronically-controlled door handle (e.g., based on motion data and/or video data for the room); determining (918) that a child is less than a predetermined distance from an unused electrical outlet or an electronically-controlled door handle (e.g., based on video data for the room); and/or determining (920) that a child is touching an unused electrical outlet or an electronically-controlled door handle (e.g., based on touch data from a touch-sensitive surface on or near an unused electrical outlet or an electronically-controlled door handle). Thus, for example, the child-protection is met if the computer system 600 determines that a child (or some other vulnerable person, e.g., an elderly person) is alone in the room for at least a threshold amount of time, that there are one or more children and/or other vulnerable persons in the room without any adults for at least a threshold amount of time, that a child or other vulnerable person is moving towards an unused electrical outlet or electrically-controlled door handle, that a child is less than a predetermined distance away from an unused electrical outlet or electrically-controlled door handle, and/or that a child is touching an unused electrical outlet or electrically-controlled door handle. Thus, in some embodiments, the child-protection condition includes one or more threshold or predefined times and/or one or more threshold or predefined distances.

In accordance with a determination that the predetermined child-protection condition is met, the computer system 600 disables or sends instructions to disable (906) at least one of the one or more unused electrical outlets (e.g., wall plug(s) 110) and/or at least one of the one or more electronically-controlled door handles in the room. In some embodiments, power is shut off to the unused electrical outlet that a child is moving towards, near, or touching. In some embodiments, power is shut off to all of the unused electrical outlets in the room. In some embodiments, power is shut off to all of the unused electrical outlets in the room that are within a predetermined distance of the child. In some embodiments, power is shut off to just the unused sockets of an outlet in lieu of shutting off power to the entire outlet. In some embodiments, an electronically-controlled door handle that a child is moving towards, near, or touching is locked so that the child cannot operate the door handle. In some embodiments, an electronically-controlled door handle that a child is moving towards, near, or touching is disengaged so that the child cannot operate the door handle. In some embodiments, all of the electronically-controlled door handles in the room are locked, disengaged, or otherwise disabled.

In some embodiments, after disabling or sending instructions to disable at least one of the one or more unused electrical outlets and/or at least one of the one or more electronically-controlled door handles, the computer system 600 receives (922) a request to enable the disabled one or more unused electrical outlets and/or the disabled one or more electronically-controlled door handles in the room. For example, the computer system detects an activation of a cancel button or a user interface element by a user (e.g., tapping on user interface icon 708, 710, or 712), a gesture by a user, or a voice command.

In some embodiments, the computer system 600 determines (924) a type for the request to enable the disabled one or more unused electrical outlets and/or the disabled one or more electronically-controlled door handles in the room. For example, the computer system detects a first type of activation of a cancel button by a user (e.g., a "press and hold" or "double tap" gesture on the cancel button; activation of a user interface element associated with the first type of activation (e.g., user element 710 or 712)), a first type of gesture by a user (e.g., a wave), or a first type of voice command (e.g., "False alarm") by a user. Alternatively, the computer system detects a second type of activation of a cancel button by a user (e.g., a "single tap" gesture on the cancel button; activation of a user interface element associated with the second type of activation (e.g., user element 708)), a second type of gesture by a user (e.g., a thumbs up), or a second type voice command (e.g., "Cancel") by a user.}

In some embodiments, in accordance with a determination that the request to enable the disabled one or more unused electrical outlets and/or the disabled one or more electronically-controlled door handles in the room is a first type of enablement request (926), the computer system 600 enables (928) the disabled one or more unused electrical outlets and/or the disabled one or more electronically-controlled door handles in the room, and modifies (930) the predetermined child-protection condition. For example, in FIG. 7, if the user activated element 710 or 712, the electrical outlets and door handles are enabled, and the child-protection condition 552 is changed based on whether element 710 or 712 was activated. If the user activated element 710, telling the computer system 600 that the disablement is a false alarm, the child-protection condition is changed so that the child-protection condition has a higher threshold (e.g., longer threshold time, and/or longer threshold distance) and is thus harder to meet. If the user activated element 712, telling the computers system 600 that the disablement should occur sooner, the child-protection condition is changed so that the child-protection condition has a lower threshold (e.g., shorter threshold time, and/or shorter threshold distance) and is thus easier to meet.

In accordance with a determination that the request to enable the disabled one or more unused electrical outlets and/or the disabled one or more electronically-controlled door handles in the room is a second type of enablement request, distinct from the first type of enablement request (932), the computer system 600 enables (934) the disabled one or more unused electrical outlets and/or the disabled one or more electronically-controlled door handles in the room without modifying the predetermined child-protection condition. For example, in FIG. 7, if the user activated element 708, telling the computer system 600 that the disablement was proper, the electrical outlets and door handles are enabled, and the child-protection condition 552 is not changed.

In some embodiments, after disabling or sending instructions to disable at least one of the one or more unused electrical outlets and/or at least one of the one or more electronically-controlled door handles, the computer system receives a request to enable the disabled one or more unused electrical outlets and/or the disabled one or more electronically-controlled door handles in the room and determines whether the enablement request is of a first type or a second type.

In some embodiments, the first type corresponds to a request to cancel a disablement that was unneeded (and possibly annoying), whereas the second type corresponds to a request to cancel a disablement that was needed and properly performed. In accordance with a determination that the request to cancel the disablement is of the first type, the computer system cancels the disablement and modifies the child-protection condition (to reduce future unneeded disablements). In accordance with a determination that the request to cancel the disablement is of the second type, the computer system cancels the disablement without modifying the child-protection condition (because the disablement was properly performed).

In some embodiments, the first type corresponds to a request to cancel a disablement that was needed but which should have occurred sooner, whereas the second type corresponds to a request to cancel a disablement that was needed and properly performed. In accordance with a determination that the request to cancel the disablement is of the first type, the computer system cancels the disablement and modifies the child-protection condition (to have future disablements given sooner, e.g., by setting lower threshold times and/or larger threshold distances to an unused electrical outlet or electronically-controlled door handle). In accordance with a determination that the request to cancel the disablement is of the second type, the computer system cancels the disablement without modifying the child-protection condition (because the disablement was properly performed).

In some embodiments, after disabling or sending instructions to disable at least one of the one or more unused electrical outlets and/or at least one of the one or more electronically-controlled door handles, the computer system receives a request to enable the disabled one or more unused electrical outlets and/or the disabled one or more electronically-controlled door handles in the room and determines whether the enablement request is of a first type, a second type, or a third type.

In some embodiments, the first type corresponds to a request to cancel a disablement that was an unneeded (and possibly annoying), the second type corresponds to a request to cancel a disablement that was needed and properly performed, and the third type corresponds to a request to cancel a disablement that was needed but which should have occurred sooner. In accordance with a determination that the request to cancel the disablement is of the first type, the computer system cancels the disablement and modifies the child-protection condition (to reduce future unneeded disablements). In accordance with a determination that the request to cancel the disablement is of the second type, the computer system cancels the disablement without modifying the child-protection condition (because the disablement was properly performed). In accordance with a determination that the request to cancel the disablement is of the third type, the computer system cancels the disablement and modifies the child-protection condition (to have future disablements given sooner, e.g., by setting lower threshold times and/or larger threshold distances to an unused electrical outlet or electronically-controlled door handle).

In some embodiments, the computer system 600 determines (936), based at least in part on the received occupancy data for the room, whether a predetermined child-protection alert condition (e.g., child-protection alert condition 548) is met. In accordance with a determination that the child-protection alert condition is met, the computer system 600 presents or sends instructions to present (938) a child-protection alert (e.g., alert 706). In some embodiments, the child-protection alert includes displaying a flashing light in one or more rooms in the dwelling, sounding an audible warning such as "[Name] is unattended in the [ ] room" or "Toddler unattended" in one or more rooms in the dwelling, and/or sending a notification (e.g., an instant message, text message, or email) to one or more occupants of the dwelling or a third party (e.g., a parent or caregiver for the child in the dwelling or a home security provider).

In some embodiments, the child-protection condition 552 and the child-protection alert condition 548 are the same; circumstances that meet the child-protection condition 552 also meets the child-protection alert condition 548. The child-protection condition 552 and the child-protection alert condition 548 may be the same, or are modified in unison. The child-protection alert also informs the user of the disablement of the unused electrical outlets and door handles, and canceling the alert also enables the unused electrical outlets and door handles (e.g., as in alert 706).

In some other embodiments, the child-protection condition 552 and the child-protection alert condition 548 are different and independent of each other; circumstances that meet the child-protection condition 552 may not necessarily meet the child-protection alert condition 548, and vice versa. The child-protection condition 552 and the child-protection alert condition 548 are modified independently of each other. The child-protection alert is not necessarily tied with disablement of the unused electrical outlets and door handles, and thus does not necessarily inform the user of the disablement, and canceling the child-protection alert does not affect the disablement. In other words, the child-protection alert and the disablement alert are separate, and their cancellations are also separate.

In some embodiments, after presenting or sending instructions to present the child-protection alert, the computer system 600 receives a request to cancel the child-protection alert. For example, the computer system detects an activation of a cancel button or a user interface element by a user (e.g., tapping on user interface element 708, 710, or 712), a gesture by a user, or a voice command.

The computer system 600 determines (942) a type for the request to cancel the child-protection alert. For example, the computer system detects a first type of activation of a cancel button by a user (e.g., a "press and hold" or "double tap" gesture on the cancel button; activation of a user interface element associated with the first type of activation (e.g., user element 710 or 712)), a first type of gesture by a user (e.g., a wave), or a first type of voice command (e.g., "False alarm") by a user. Alternatively, the computer system detects a second type of activation of a cancel button by a user (e.g., a "single tap" gesture on the cancel button; activation of a user interface element associated with the second type of activation (e.g., user element 708)), a second type of gesture by a user (e.g., a thumbs up), or a second type voice command (e.g., "Cancel") by a user.

In accordance with a determination (944) that the request to cancel the child-protection alert is a first type of cancellation request, the computer system 600 cancels (946) the child-protection alert (e.g., alert 706), and modifies (948) the predetermined child-protection alert condition (e.g., child-protection alert condition 548). For example, in FIG. 7, if the user activated element 710 or 712, the alert 706 is cancelled, and the child-protection alert condition 548 is changed based on whether element 710 or 712 was activated. If the user activated element 710, telling the computer system 600 that the alert is a false alarm, the child-protection alert condition is changed so that the child-protection alert condition has a higher threshold (e.g., longer threshold time, and/or longer threshold distance) and is thus harder to meet. If the user activated element 712, telling the computers system 600 that the alert should occur sooner, the child-protection alert condition is changed so that the child-protection alert condition has a lower threshold (e.g., shorter threshold time, and/or shorter threshold distance) and is thus easier to meet.

In some embodiments, the child-protection alert condition (e.g., child-protection alert condition 548) for presenting or sending instructions to present the child-protection alert is the same as the child-protection condition (e.g., child-protection condition 552) for disabling or sending instructions to disable at least one of the one or more unused electrical outlets and/or at least one of the one or more electronically-controlled door handles in the room.

In accordance with a determination (950) that the request to cancel the child-protection alert is a second type of cancellation request, distinct from the first type of cancellation request, the computer system 600 cancels (952) the child-protection alert (e.g., alert 706) without modifying the predetermined child-protection alert condition (e.g., child-protection alert condition 548). For example, in FIG. 7, if the user activated element 708, telling the computer system 600 that the alert 706 was proper, the alert 706 is cancelled and the child-protection alert condition 548 is not changed.

In some embodiments, after presenting or sending instructions to present the child-protection alert, the computer system receives a request to cancel the child-protection alert and determines whether the request to cancel the child-protection alert is of a first type or a second type.

In some embodiments, the first type corresponds to a request to cancel an alert that was an unneeded (and possibly annoying) false alarm, whereas the second type corresponds to a request to cancel an alert that was needed and properly given. In accordance with a determination that the request to cancel the child-protection alert is of the first type, the computer system cancels the child-protection alert and modifies the child-protection alert condition (to reduce future false alerts). In accordance with a determination that the request to cancel the child-protection alert is of the second type, the computer system cancels the child-protection alert without modifying the child-protection alert condition (because the alert was properly given).

In some embodiments, the first type corresponds to a request to cancel an alert that was needed but which should have issued sooner, whereas the second type corresponds to a request to cancel an alert that was needed and properly given. In accordance with a determination that the request to cancel the child-protection alert is of the first type, the computer system cancels the child-protection alert and modifies the child-protection alert condition (to have future child-protection alerts given sooner, e.g., by setting lower threshold times and/or larger threshold distances to an unused electrical outlet or electronically-controlled door handle). In accordance with a determination that the request to cancel the child-protection alert is of the second type, the computer system cancels the child-protection alert without modifying the child-protection alert condition (because the alert was properly given).

In some embodiments, after presenting or sending instructions to present the child-protection alert, the computer system receives a request to cancel the child-protection alert and determines whether the request to cancel the child-protection alert is of a first type, a second type, or a third type.

In some embodiments, the first type corresponds to a request to cancel an alert that was an unneeded (and possibly annoying) false alarm, the second type corresponds to a request to cancel an alert that was needed and properly given, and the third type corresponds to a request to cancel an alert that was needed but which should have issued sooner. In accordance with a determination that the request to cancel the child-protection alert is of the first type, the computer system cancels the child-protection alert and modifies the child-protection alert condition (to reduce future false alerts). In accordance with a determination that the request to cancel the child-protection alert is of the second type, the computer system cancels the child-protection alert without modifying the child-protection alert condition (because the alert was properly given). In accordance with a determination that the request to cancel the child-protection alert is of the third type, the computer system cancels the child-protection alert and modifies the child-protection alert condition (to have future child-protection alerts given sooner, e.g., by setting lower threshold times and/or larger threshold distances to an unused electrical outlet or electronically-controlled door handle).

In some embodiments, a housing that contains the computer system (e.g., computer system 600) also contains (954) at least one of the one or more sensors in the room providing occupancy data (e.g., image/video capture device 524, motion sensor 522, etc.).

In some embodiments, the computer system (e.g., computer system 600) is located (956) in the dwelling at a separate location from the one or more sensors in the room (e.g., the computer system is a controller for the dwelling that receives data from multiple sensors in the dwelling). For example, the computer system 600 is in a different room 152 than the room that includes the sensors.

In some embodiments, the computer system (e.g., computer system 600) is located (958) in a smart home provider server system (e.g., smart home provider server system 164) remote from the dwelling.

For situations in which the systems discussed above collect information about users, the users may be provided with an opportunity to opt in/out of programs or features that may collect personal information (e.g., information about a user's preferences or usage of a smart device). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, the teachings above concerning smart door handles could be applied in an analogous manner to smart window handles. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a computer system:
receiving occupancy data for a room in a smart home environment;
determining, based at least in part on the received occupancy data for the room, whether a predetermined child-protection alert condition is met;
in accordance with a determination that the predetermined child-protection alert condition is met, presenting or sending instructions to issue a child-protection alert;
after the presenting or sending instructions to issue a child-protection alert, receiving a request to cancel the child-protection alert;
in accordance with a determination that the request to cancel corresponds to a child-protection alert that was unneeded, wherein the request includes cancelling a first disablement:
canceling the child-protection alert; and
modifying the predetermined child-protection alert condition;
in accordance with a determination that the request to cancel corresponds to a child-protection alert that was needed and properly performed, wherein the request includes cancelling a second disablement:
canceling the child-protection alert; and
foregoing modifying the predetermined child-protection alert condition; and
in accordance with a determination that the request to cancel corresponds to a child protection alert that was needed but late in being presented:
canceling the child-protection alert; and
changing the predetermined child-protection alert condition.

2. The method of claim 1, wherein determining, based at least in part on the received occupancy data for the room, whether the predetermined child-protection alert condition is met includes determining that a child is the lone occupant in the room for at least a threshold amount of time.

3. The method of claim 1, wherein changing the predetermined child-protection alert condition includes changing a threshold time and/or a threshold distance to at least one unused electrical outlet and/or at least one electronically-controlled door handle.

4. A computer system of a smart home environment, comprising:
one or more processors;
memory; and
one or more programs stored in the memory and configured to be executed by the one or more processors, the one or more programs including instructions for:
receiving occupancy data for a room of the smart home environment;
determining, based at least in part on the received occupancy data for the room, whether a predetermined child-protection alert condition is met;
in accordance with a determination that the predetermined child-protection alert condition is met, presenting or sending instructions to issue a child-protection alert;
after the presenting or sending instructions to issue a child-protection alert, receiving a request to cancel the child-protection alert;
in accordance with a determination that the request to cancel corresponds to a child-protection alert that was unneeded, wherein the request includes cancelling a first disablement:
canceling the child-protection alert; and
modifying the predetermined child-protection alert condition;
in accordance with a determination that the request to cancel corresponds to a child-protection alert that was needed and properly performed, wherein the request includes cancelling a second disablement:
canceling the child-protection alert; and
foregoing modifying the predetermined child-protection alert condition; and
in accordance with a determination that the request to cancel corresponds to a child protection alert that was needed but late in being presented:
canceling the child-protection alert; and
changing the predetermined child-protection alert condition.

5. The computer system of claim 4, wherein the instructions for presenting or sending instructions to issue a child-protection alert include instructions for displaying a visual warning in one or more rooms, sounding an audible warning in the one or more rooms, and/or sending a notification to one or more occupants of the smart home environment or to a third party.

6. The computer system of claim 4, wherein the instructions for receiving occupancy data for a room of a smart home environment include instructions for receiving occupancy data from one or more of: a motion sensor, an optical sensor, an audio sensor, a touch sensor, a pressure sensor, and an ambient sensor, in the room of the smart home environment.

7. The computer system of claim 4, wherein the received occupancy data for the room include one or more of: motion data, video data, audio data, and touch data.

8. The computer system of claim 6, further comprising instructions for identifying one or more categories of individuals based on the received occupancy data for the room.

9. The computer system of claim 4, the one or more programs further comprising instructions for:
   displaying, on a display of a client device associated with a user of the smart home environment:
      a user interface for presenting the child-protection alert; and
      one or more user-selectable cancellation options.

10. The computer system of claim 9, the one or more programs further comprising instructions for:
   transmitting to the computer system user feedback in accordance with a user selection of the one or more user-selectable cancellation options; and
   wherein the determination of the request to cancel is in accordance with the user selection of the one or more user-selectable cancellation options.

11. The computer system of claim 10, wherein the user selection of the one or more user-selectable cancellation options is made using a voice command of the user.

12. The computer system of claim 9, wherein the user interface is generated based on information from the computer system.

13. A non-transitory computer readable storage medium storing one or more programs for execution by one or more processors of a computer system of a smart home environment, the one or more programs comprising instructions for:
   receiving occupancy data for a room in a smart home environment;
   determining, based at least in part on the received occupancy data for the room, whether a predetermined child-protection alert condition is met;
   in accordance with a determination that the predetermined child-protection alert condition is met, presenting or sending instructions to issue a child-protection alert;
   after the presenting or sending instructions to issue a child-protection alert, receiving a request to cancel the child-protection alert;
   in accordance with a determination that the request to cancel corresponds to a child-protection alert that was unneeded, wherein the request includes cancelling a first disablement:
      canceling the child-protection alert; and
      modifying the predetermined child-protection alert condition;
   in accordance with a determination that the request to cancel corresponds to a child-protection alert that was needed and properly performed, wherein the request includes cancelling a second disablement:
      canceling the child-protection alert; and
      foregoing modifying the predetermined child-protection alert condition; and
   in accordance with a determination that the request to cancel corresponds to a child protection alert that was needed but late in being presented:
      canceling the child-protection alert; and
      changing the predetermined child-protection alert condition.

14. The non-transitory computer-readable storage medium of claim 13, wherein the room includes:
   one or more unused electrical outlets; and/or
   one or more electronically-controlled door handles.

15. The non-transitory computer-readable storage medium of claim 14, wherein:
   canceling the first disablement includes canceling a disablement of at least one of the one or more unused electrical outlets and/or the one or more electronically-controlled door handles that is not needed; and
   canceling the second disablement includes canceling a disablement of at least one of the one or more unused electrical outlets and/or the one or more electronically-controlled door handles that is needed and properly performed.

16. The non-transitory computer-readable storage medium of claim 14, the one or more programs further comprising instructions for:
   disabling at least one of the one or more unused electrical outlets and/or at least one of the one or more electronically-controlled door handles in the room in accordance with the determination the predetermined child-protection alert condition is met.

17. The non-transitory computer-readable storage medium of claim 14, the one or more programs further comprising instructions for:
   in accordance with a determination that the predetermined child-protection condition is met, disabling or sending instructions to disable one or more of: the one or more unused electrical outlets and/or, the one or more electronically-controlled door handles;
   after the disabling or the sending instructions to disable, receiving a request to enable the disabled one or more of: the one or more unused electrical outlets and/or the one or more electronically-controlled door handles;
   determining a type for the received enablement request;
   in accordance with a determination that the received enablement request is a first type of enablement request:
      enabling the disabled one or more of: the one or more unused electrical outlets and/or the one or more electronically-controlled door handles, and
      modifying the predetermined child-protection condition; and
   in accordance with a determination that the received enablement request is a second type of enablement request, distinct from the first type of enablement request:
      enabling the disabled one or more of: the one or more unused electrical outlets and/or, the one or more electronically-controlled door handles, and
      forgoing modifying the predetermined child-protection condition.

18. The non-transitory computer readable storage medium of claim 13, wherein the computer system is located in a smart home provider server system remote from the smart home environment.

19. The non-transitory computer readable storage medium of claim 13, wherein the instructions for receiving occupancy data for a room of a smart home environment include instructions for receiving occupancy data from one or more sensors in the room of the smart home environment; and
   wherein the computer system is located in the smart home environment at a separate location from the one or more sensors in the room.

* * * * *